(12) United States Patent
Lowes et al.

(10) Patent No.: US 10,859,753 B2
(45) Date of Patent: Dec. 8, 2020

(54) LUMINAIRES UTILIZING WAVEGUIDES WITH EXTRACTION FEATURE PATTERNS

(71) Applicant: IDEAL Industries Lighting LLC, Sycamore, IL (US)

(72) Inventors: Theodore D. Lowes, Durham, NC (US); Matthew Berry, Durham, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

(21) Appl. No.: 15/972,199

(22) Filed: May 6, 2018

(65) Prior Publication Data

US 2018/0252858 A1   Sep. 6, 2018

Related U.S. Application Data

(63) Continuation-in-part of application No. 15/419,538, filed on Jan. 30, 2017, now Pat. No. 10,502,374.
(Continued)

(51) Int. Cl.
*F21V 8/00* (2006.01)
*B44F 1/02* (2006.01)
(Continued)

(52) U.S. Cl.
CPC ............. *G02B 6/0045* (2013.01); *B44F 1/02* (2013.01); *B44F 7/00* (2013.01); *F21S 8/04* (2013.01);
(Continued)

(58) Field of Classification Search
CPC .. G02B 6/0045; G02B 6/0028; G02B 6/0036; G02B 6/0061; G02B 6/0076; G02B 6/0021; G02B 6/0068; G02B 6/0073; G02B 6/0078; G02B 6/0083; G02B 6/002; G02B 6/0091; G09F 13/18; G09F 2013/049; G09F 2013/1831; G09F 2013/1886; G09F 2013/189; F21S 8/04; B44F 1/02; B44F 7/00; F21Y 2113/10; F21Y 2103/10; F21Y 2103/20
See application file for complete search history.

(56) References Cited

U.S. PATENT DOCUMENTS

| | | | | |
|---|---|---|---|---|
| 5,823,652 A | * | 10/1998 | Vann | G02B 6/0028 362/554 |
| 7,246,932 B2 | * | 7/2007 | Burtsev | G02B 6/0001 362/23.16 |

(Continued)

*Primary Examiner* — Alan B Cariaso
(74) *Attorney, Agent, or Firm* — Withrow & Terranova, P.L.L.C; Vincent K. Gustafson

(57) ABSTRACT

According to an aspect of the present disclosure, a luminaire comprises a plurality of waveguides, a light source arranged to direct light into the plurality of waveguides, and a plurality of extraction feature patterns. The luminaire contemplated by the present disclosure is arranged with the plurality of waveguides are aligned such that an extraction feature pattern extracts light out of a first waveguide of the plurality of waveguides and a second extraction feature pattern extracts light out of a second waveguide of the plurality of waveguides. Further, in accordance with this aspect, the light extracted out of the first waveguide is directed through the second waveguide to develop an appearance of depth.

23 Claims, 17 Drawing Sheets

Related U.S. Application Data

(60) Provisional application No. 62/628,131, filed on Feb. 8, 2018.

(51) Int. Cl.
*F21S 8/04* (2006.01)
*B44F 7/00* (2006.01)
*F21Y 113/10* (2016.01)
*F21Y 103/20* (2016.01)

(52) U.S. Cl.
CPC ......... *G02B 6/0021* (2013.01); *G02B 6/0028* (2013.01); *G02B 6/0036* (2013.01); *G02B 6/0061* (2013.01); *G02B 6/0068* (2013.01); *G02B 6/0073* (2013.01); *G02B 6/0076* (2013.01); *G02B 6/0078* (2013.01); *G02B 6/0083* (2013.01); *F21Y 2103/20* (2016.08); *F21Y 2113/10* (2016.08)

(56) References Cited

U.S. PATENT DOCUMENTS

| | | | |
|---|---|---|---|
| 7,802,908 B2 * | 9/2010 | Lin | G02B 6/006 362/559 |
| 7,872,705 B2 | 1/2011 | Medendorp, Jr. et al. | |
| 7,914,195 B2 * | 3/2011 | Sawada | G02B 6/0076 362/612 |
| 8,541,795 B2 | 9/2013 | Keller et al. | |
| 8,564,737 B2 | 10/2013 | Medendorp, Jr. et al. | |
| 8,564,739 B2 | 10/2013 | Medendorp, Jr. et al. | |
| 8,564,742 B2 | 10/2013 | Medendorp, Jr. et al. | |
| 8,975,827 B2 | 3/2015 | Chobot et al. | |
| 9,195,095 B2 | 11/2015 | Medendorp, Jr. et al. | |
| 9,442,243 B2 | 9/2016 | Tarsa | |
| 9,656,598 B1 * | 5/2017 | Salter | F21K 9/64 |
| 9,690,029 B2 | 6/2017 | Keller et al. | |
| 9,706,617 B2 | 7/2017 | Carrigan et al. | |
| 9,818,919 B2 | 11/2017 | Lowes et al. | |
| 9,869,432 B2 | 1/2018 | Keller et al. | |
| 10,278,250 B2 | 4/2019 | McBryde et al. | |
| 10,451,229 B2 | 10/2019 | Keller et al. | |
| 10,465,869 B2 | 11/2019 | Keller et al. | |
| 10,502,374 B2 | 12/2019 | Leung et al. | |
| 2005/0072032 A1 * | 4/2005 | McCollum | F21V 5/00 40/546 |
| 2007/0124970 A1 * | 6/2007 | Hjaltason | G02B 6/0021 40/546 |
| 2010/0027293 A1 * | 2/2010 | Li | G02B 6/0036 362/619 |
| 2010/0046219 A1 * | 2/2010 | Pijlman | G02B 6/0021 362/235 |
| 2012/0320626 A1 * | 12/2012 | Quilici | F21S 8/04 362/606 |
| 2013/0121001 A1 * | 5/2013 | Shani | G02B 6/0091 362/296.01 |
| 2014/0043856 A1 * | 2/2014 | Thompson | F21V 3/049 362/613 |
| 2014/0321136 A1 * | 10/2014 | Reuschel | B60Q 9/00 362/511 |
| 2016/0003445 A1 * | 1/2016 | Hu | F21V 7/22 362/516 |
| 2016/0363710 A1 * | 12/2016 | Van Boven | F21V 33/006 |
| 2017/0336563 A1 | 11/2017 | Tarsa et al. | |
| 2018/0052272 A1 * | 2/2018 | Cornelissen | G02B 6/0021 |
| 2018/0246270 A1 * | 8/2018 | Di Trapani | G02B 6/0013 |
| 2019/0242539 A1 | 8/2019 | Roberts | |

\* cited by examiner

LUMINAIRES UTILIZING WAVEGUIDES WITH EXTRACTION FEATURE PATTERNS

CROSS REFERENCE TO RELATED APPLICATIONS

The present application is a continuation-in-part of U.S. patent application Ser. No. 15/419,538, filed Jan. 30, 2017 and subsequently published as U.S. Patent Application Publication No. 2018-0216791A1; and claims the benefit of U.S. Provisional Patent Application Ser. No. 62/628,131, filed Feb. 8, 2018, the entire disclosures of which are hereby incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to general illumination lighting, and more particularly, to outdoor, indoor, and/or enclosed structure luminaires usable, for example, in home, office, and/or warehouse settings to produce aesthetically desirable lighting solutions.

BACKGROUND

Large areas of open indoor space, such as an office or warehouse spaces, require sufficient lighting to allow for safe and comfortable activities by persons occupying or visiting the space at all times including periods when natural lighting, such as that provided by windows, is unavailable or reduced during nighttime, rainy or foggy weather conditions, and/or in the absence of windows. An indoor luminaire for large indoor spaces or smaller indoor spaces, such as hallways or individual office spaces, must illuminate spaces varying in size, floor plan, and intended use. It may be useful for such a luminaire to provide customizable illumination patterns in order to effectively match the light produced by the luminaire with the characteristics of the space to be illuminated. Still further, such a luminaire should be customizable such that desired illumination patterns may be achieved. Additionally, such a luminaire should be aesthetically pleasing, and further, versatile enough to provide illumination patterns suitable for the varied environments mentioned hereinabove.

Often times, skylights are used to provide natural light (i.e., daylight) in residential, commercial and other buildings, as well as in other structures. Conventional skylights can pose numerous problems, including water leakage, heat loss, lack of light on overcast or stormy days, difficulty installing, and/or impossibility/impracticality of installing, e.g., location in the first story of a multi-story structure. In addition, conventional skylights, not unlike other natural light windows, typically get dirty, streaked and/or smeared, and as a result there is often a frequent desire (or need) to clean said conventional skylight. In addition, direct sunlight can sometimes produce a great deal of glare on work surfaces and other items, e.g., computer screens, and such glare is typically counterproductive and/or undesirable. Also, direct sunlight (and/or resulting glare) may increase eye strain. Therefore, a substitute for conventional skylights that comprises one or more relatively thin waveguides represents an improvement in the art.

Advances in light emitting diode (LED) technology have resulted in wide adoption of luminaires that incorporate such devices. While LEDs can be used alone to produce light without the need for supplementary optical devices, it has been found that optical modifiers, such as lenses, reflectors, optical waveguides, and combinations thereof, can significantly improve illumination distribution for particular applications.

An optical waveguide mixes and directs light emitted by one or more light sources, such as one or more LEDs. A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Low-profile LED-based luminaires have recently been developed that utilize a string of LED components directed into the edge of a waveguiding element (an "edge-lit" or "edge-coupled" approach). However, such luminaires typically suffer from low efficiency due to losses inherent in coupling light emitted from a predominantly Lambertian emitting source such as a LED component into the narrow edge of a waveguide plane.

The description provided in the background section should not be assumed to be prior art merely because it is mentioned in or associated with the background section. The background section may include information that describes one or more aspects of the subject technology.

SUMMARY

According to an aspect of the present disclosure, a luminaire comprises a plurality of waveguides, a light source arrange to direct light into the plurality of waveguides, and a plurality of extraction feature patterns. The luminaire contemplated by the present disclosure is arranged with the plurality of waveguides are aligned such that an extraction feature pattern extracts light out of a first waveguide of the plurality of waveguides and a second extraction feature pattern extracts light out of a second waveguide of the plurality of waveguides. Further, in accordance with this aspect, the light extracted out of the first waveguide is directed through the second waveguide to develop an appearance of depth.

In another aspect of this disclosure, an optical waveguide comprises a waveguide body, first and second light sources respectively directing light into the waveguide at first and second coupling portions, and first and second extraction feature patterns. Further, in accordance with this aspect, the first extraction feature pattern extracts a first spectrum of light from the first coupling portion, and the second extraction feature pattern extracts a second spectrum of light from the second coupling portion.

In another aspect of this disclosure, a lighting system comprises first and second waveguides aligned along a plane adjacent one another, at least one light emitting diode associated with each of the first and second waveguides for coupling light into the respective first and second waveguides, and first and second planar light emitting surfaces of the first and second waveguides. Further, according to this aspect, the light emitting surfaces of the first and second waveguides emit light in substantially the same direction transverse to the plane, and the light emitted from the first waveguide traverses the second waveguide such that the light appears to have a source depth greater than a location of the first waveguide.

Yet another aspect contemplated by the present disclosure is an optical waveguide comprising a plurality of extraction features disposed in a waveguide body, at least two LEDs directing light into the waveguide body, first and second planar surfaces, and first and second waveguide portions. Still further, in accordance with this aspect, the plurality of extraction features are disposed on the first and second waveguide portions, and the first and second waveguide portions emit at least first and second colors of light.

Other aspects and advantages will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
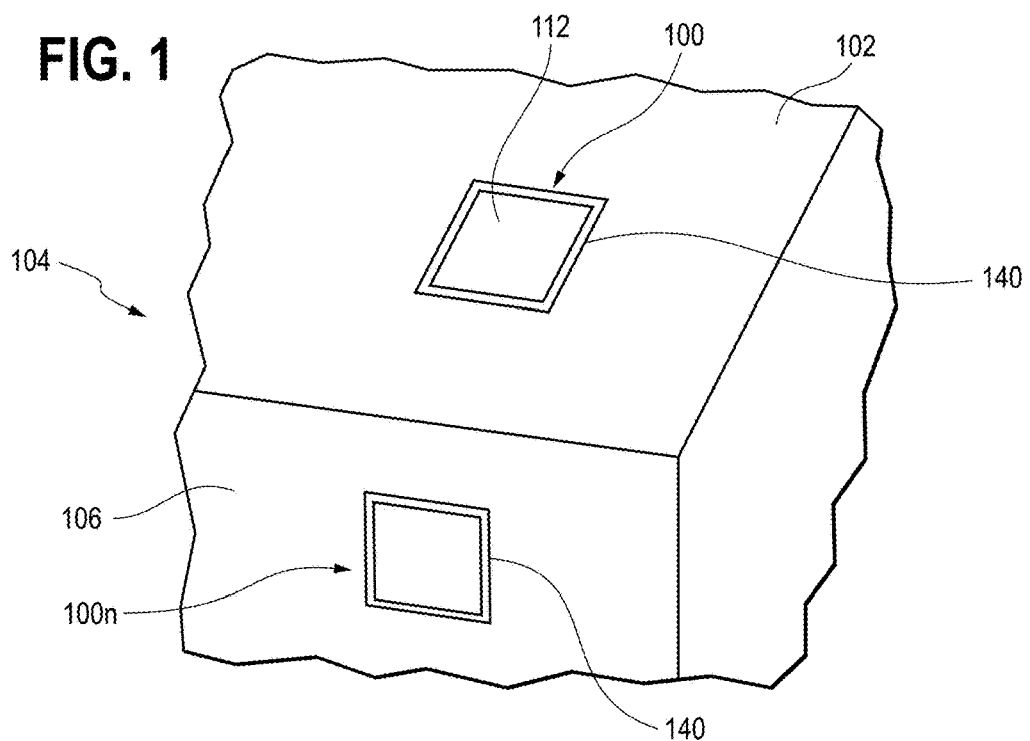
FIG. 1 illustrates a luminaire according to the present disclosure disposed in a ceiling and/or a wall.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure. Throughout the drawings, identical reference numbers may designate similar, but not necessarily identical, elements. Use herein of a reference numeral without an index number, where such reference numeral is referred to elsewhere with an index number, may be a general reference to the corresponding plural elements, collectively or individually.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, components and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

As shown in the FIGS., disclosed herein are embodiments of luminaires and/or light fixtures for general lighting, task lighting, or the like; more particularly, for illumination of spaces of varying size and floor plan such as a warehouse, office space, hallway, dwelling, or other space. Preferably, the illuminated space comprises an indoor space, although the luminaires disclosed herein may be used in other applications, such as an outdoor space or in a covered spaced exposed to the weather.

Referring now to FIG. 1, an example embodiment of a luminaire/lighting system 100 according to the present disclosure is illustrated. The luminaire 100 is configured as a skylight and disposed within a ceiling 102 of a space to be illuminated. Example embodiments of the luminaire 100 may be disposed within a wall 106. Also in embodiments, the luminaire/lighting system 100 may be disposed in a ceiling and/or wall of a hallway. The luminaire/lighting system 100 may provide, among other things, the aesthetic, design, and functional properties of an equivalent conventional skylight that allows natural light into a space to be illuminated. The luminaire/lighting system 100 may mimic the appearance and/or effects of a conventional skylight, and/or give an "outdoor" feeling to an indoor space, in some cases even with no exterior light supplied by any windows or doors, and instead using the principles of total internal reflection (TIR) and one or more optical waveguides 112. Still further, the waveguide bodies contemplated herein are made of any suitable optically transmissive material, such as an acrylic material, a silicone, a polycarbonate, a glass material, a cyclic olefin copolymer, air, or other suitable material(s), or combinations thereof to achieve a desired effect and/or appearance.

The present disclosure contemplates that the luminaire/lighting system 100 may provide an appearance effect 108 (FIG. 12) such as the illusion of depth, perspective, optical illusions, patterns, skylight imitation, and/or another desired optical effect. Still further, the luminaire/lighting system 100 may provide patterns complementary to the illuminated space. In example embodiments, the appearance of the luminaire/lighting system 100 supplies one or more of the aforementioned desirable effects. Also in example embodiments, the luminaire/lighting system 100 may produce one or more desirable illumination effects such as one or more light distribution and/or illumination patterns in the space to be illuminated. Still further in example embodiments, the desirable appearance effect 108 of the luminaire/lighting system 100 may be directly or indirectly associated with one of the desirable illumination effects.

The present disclosure further contemplates the luminaire/lighting system 100, 104 comprising one or more luminaires 100a, 100b, 100n. Each of the luminaires 100n may produce one or more of the appearance effects 108 and/or illumination effects. Each of the luminaires 100n, in operation together to form a coordinated and/or networked lighting system 104, may provide one or more appearance effects 108 and/or illumination effects to develop overall appearance and/or illumination effects desirable for the lighting system 104 as a whole. The luminaire 100 detailed hereinthroughout may be referred to interchangeably as the luminaire 100, the skylight 100, the fixture 100, the lighting apparatus 100, and/or the lighting device 100; and further may comprise one or more optical waveguides 112, each comprising a waveguide body 110, and one or more light sources comprising one or more light emitting diodes (LEDs) 130 and/or another suitable light source (such as a fluorescent bulb, incandescent bulb, and/or excimer lamp).

Figure 2:
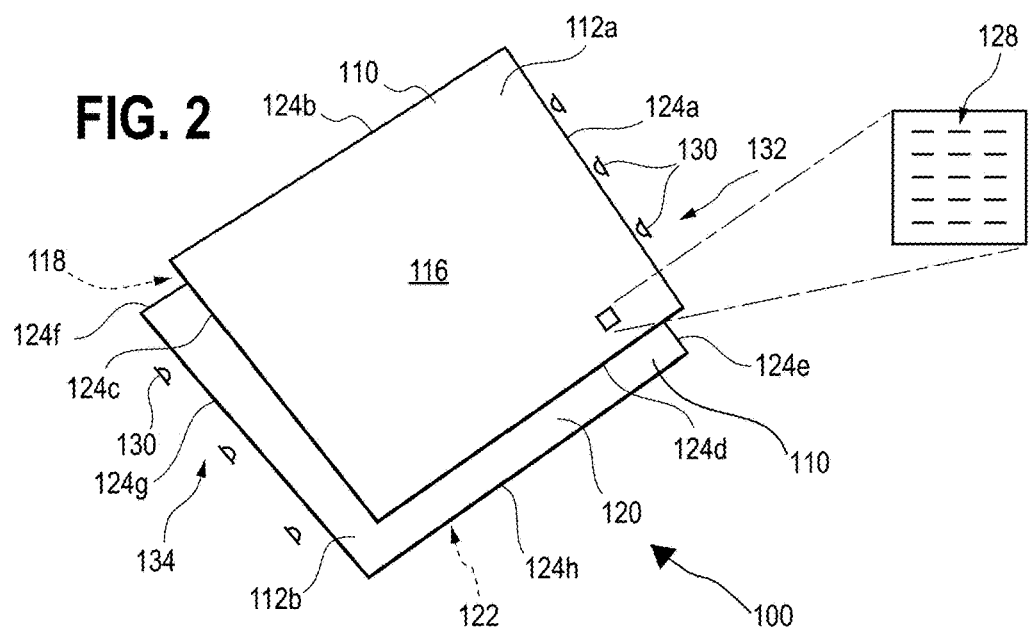
FIG. 2 is an isometric exploded view from above illustrating the luminaire of the present disclosure.
Figure 3:
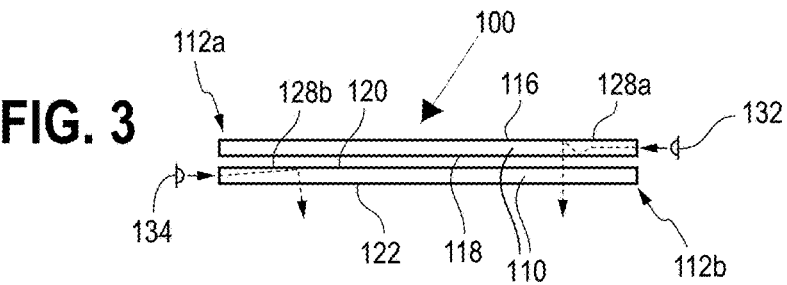
FIG. 3 is a side elevational view illustrating the luminaire of the present disclosure with a housing therefor omitted.

In FIG. 2, an example construction of the luminaire 100 is depicted. In this embodiment, the luminaire 100 comprises a first optical waveguide 112a and a second optical waveguide 112b. The first waveguide 112a has respective upper and lower surfaces 116, 118 while the second waveguide 112b also has respective upper and lower surfaces 120, 122. The lower surface 118 of the first waveguide 112a and the upper surface 120 of the lower waveguide 112b are disposed adjacent one another, as illustrated in FIG. 3, and aligned along a plane. The edge coupled optical waveguides 112a, 112b of the luminaire 100 may be about 1 cm apart. Hereinthroughout, waveguides having light directed into an edge surface thereof may be referred to as edge coupled and/or edge lit optical waveguide interchangeably.

In the example embodiment of FIG. 2, the first and second waveguides 112a, 112b are square/rectangular in shape. Therefore, the first waveguide 112a comprises first, second, third, and fourth edge surfaces 124a, 124b, 124c, 124d. Similarly, the second waveguide 112b comprises first, second, third, and fourth edge surfaces 124e, 124f, 124g, 124h. Extraction features 128 are disposed on one or more planar surfaces 116, 118, 120, 122 of the first and second 112a, 112b waveguides. In this embodiment, the first and second waveguides 112a, 112b may comprise other shapes (from a plan view) such as triangles, circles, ovals, asymmetric shapes, and/or other suitable shapes.

Referring still to FIGS. 2 and 3, one or more LED elements or modules 130 illuminate the first and second waveguides 112a, 112b. The LEDs 130 may be arranged as first and second pluralities of LEDs 132, 134 disposed along one or more edge surfaces 124 of the first and second waveguides 112a, 112b, respectively. In FIG. 3, the luminaire 100 comprises first and second pluralities of LEDs 132, 134 configured as one or more strings of LEDs 130. The first plurality of LEDs 132 is disposed along the edge surface 124a of the first waveguide 112a while the second plurality of LEDs 134 is disposed along the edge surface 124g of the second waveguide 112b.

Light developed by the first plurality of LEDs 132 is directed into the waveguide body 110 of the first waveguide 112a through the edge surface 124a. Similarly, light developed by the second plurality of LEDs 134 is directed into the waveguide body 110 of the second waveguide 112b through the edge surface 124g. In example embodiments, the pluralities of LEDs 132, 134 may extend along more than one of the edge surfaces 124 of the first and second waveguides 112a, 112b, thereby directing light into the waveguides 112a, 112b from more than one direction. The quantity, arrangement, and relative locations of the LEDs 130 may be selected to introduce light into the first and second waveguides 112a, 112b in an amount and from a direction suitable for producing one or more of the above-noted appearance effects 108 and/or desired illumination effects.

Also, in example embodiments, the LEDs 130 may be coupled to the first and/or second waveguides 112a, 112b at locations other than the edges 124 thereof. One or more coupling cavities may be disposed on the planar surfaces 116, 118, 120, 122 of the first and/or second waveguides 112a, 112b. Also, in embodiments, the LEDs 130 may be aligned with one or more interior coupling cavities 170 (see FIG. 9B) spaced apart from the edges 124 of the waveguide(s) 112a, 112b. Embodiments described hereinthroughout as edge coupled or edge lit may comprise, alternatively or additionally, one or more interior coupling cavities and/or other suitable LED coupling configurations for introducing light into the one or more waveguides 112a, 112b.

Light is directed out and away from the first and second waveguides 112a, 112b by the extraction features 128. Referring to FIGS. 2 and 3, in example embodiments, extraction features 128a of the first, upper waveguide 112a are disposed on the upper surface 116 thereof. These extraction features 128a direct light, produced by the first plurality of LEDs 132 and entering the first waveguide 112a through one of the edge surfaces 124a, 124b, 124c, 124d, out of and away from the lower surface 118 thereof. Light directed out of the lower surface 118 of the upper waveguide 112a may enter the lower waveguide 112b through the upper surface 120 thereof.

The upper surface 122 of the lower waveguide 112b may also have extraction features 128b disposed thereon. The extraction features 128b of the lower waveguide 112b also direct light, produced by the second plurality of LEDs 134 and entering the second waveguide 112b through one of the edge surfaces 124e, 124f, 124g, 124h, out of and away from the second waveguide 112b through the lower surface 122 thereof. To produce the appearance effects 108 and illumination effects contemplated herein, the extraction features 128a, 128b are disposed in different patterns 142 (see FIGS. 4-9) respectively disposed on the first and second waveguides 112a, 112b.

Figure 4:
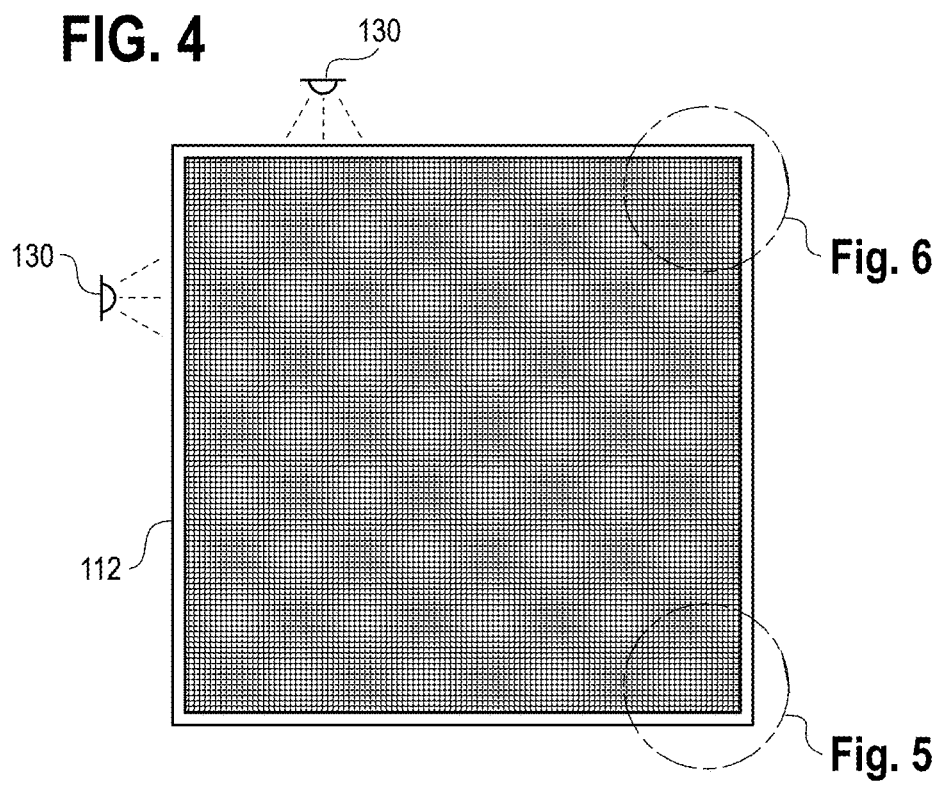
FIG. 4 is a plan view illustrating a planar surface of a waveguide of the luminaire of the present disclosure.
Figure 5:
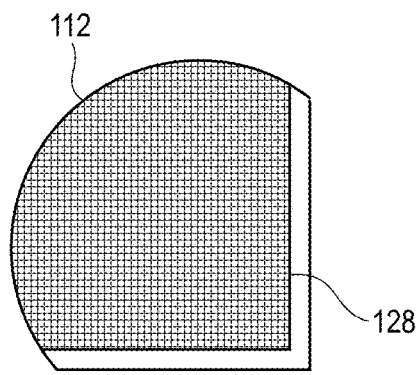
FIGS. 5 and 6 are enlarged views of the planar surface of the waveguide of FIG. 4 illustrating extraction features disposed thereon.
Figure 6:
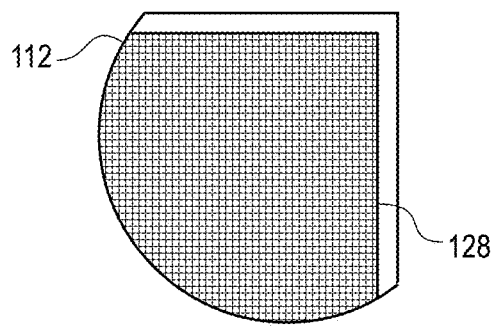

Referring now to FIGS. 4-6, the extraction features 128 and examples of the extraction feature patterns 142 are shown and described. The number, geometry, and spatial array of the extraction features 128 across a waveguide body affects the uniformity and distribution of emitted light. As shown in the example waveguide 112 in FIGS. 4-6, the discrete extraction features 128 may be formed in one or more schemes/arrays. In example embodiments variable extraction feature size is utilized to obtain a uniform or nearly uniform distribution of light. Specifically, the extraction features 128 may be arranged in rows and columns wherein the features in each row extend left to right and the features in each column extend top to bottom as seen in FIGS. 2, 5, and 6. The extraction features 128 closest to the LEDs 130 may be generally smaller and/or more widely spaced apart so that along the length dimension of the waveguide 112 the majority of light travels past such features to be extracted at subsequent parts of the waveguide 112. This results in a gradual extraction of light over the length of the waveguide 112. The center-to-center spacing of extraction features 128 in each row may be preferably constant, although such spacing may be variable, if desired. The extraction features 128 contemplated herein may be formed by injection molding, embossing, laser cutting, calendar rolling, or the extraction features may added to the waveguide 112 by a film. In further example embodiments, this progression and arrangement of extraction features 128 may be reversed or otherwise ordered to achieve the desired appearance or illumination effect 108. Still further, in embodiments, the extraction features and/or extraction surfaces may be fabricated by texturing, roughening, sanding, and/or other suitable methods of producing surface features for directing light out of and/or away from a waveguide 112.

The luminaire 100 may include a housing 140 (FIG. 1) comprising, among other things, one or more of driver circuitry, the LEDs 130, control circuitry, sensor(s), power circuitry, circuit board(s), or other components. Furthermore, luminaires described herein may be networked with other luminaires, to form the lighting system or lighting network 104, using wired connections or wireless technology and the operation thereof (on/off and/or color and/or color temperature) may be controlled as desired, for example in coordinated or stand-alone fashion. The LEDs 130 hereinthroughout may be substantially the same or modified in size, shape, color, number, and/or other characteristics to fit housing and illumination specifications of particular luminaire applications/configurations described herein. The housing 140 further provides structural support to the optical waveguides 112a, 112b whereabouts said housing 140 meets one or more of the edge surfaces 124 of the respective waveguides 112a, 112b.

Each of the LED elements or modules 130 (FIGS. 2-4 and 10) may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 130 or a plurality of such elements or modules may include one or more blue shifted yellow LEDs and one or more red LEDs. The LEDs 130 may be disposed in different configurations and/or layouts as desired. Different color temperatures and appearances may be produced using other LED combinations, as is known in the art. In one embodiment, the light source comprises any LED, for example, an MT-G LED incorporating TrueWhite® LED technology or as disclosed in U.S. Pat. No. 9,818,919, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is hereby incorporated by reference herein, may be utilized. In some embodiments, each of the LED elements or modules 130 may comprise one or more LEDs disposed within a coupling cavity with an air gap being disposed between the LED element or module 130 and a light input surface, such as the edge surfaces 124. In any of the embodiments disclosed herein each of the LED element(s) or module(s) 130 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source. Still further, any of the LED arrangements and optical elements disclosed in U.S. Pat. No. 9,869,432, filed Dec. 9, 2013, entitled "Luminaires Using Waveguide Bodies and Optical Elements" by Keller et al., which is hereby incorporated by reference herein, may be used.

The waveguides 112 contemplated herein may be tapered depending on application. Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These interactions can be used to extract and control light within the waveguide. When combined with dedicated extraction features, tapering allows one to change the incident angular distribution across an array of features. This, in turn, controls how much, and in what direction light is extracted. Thus, a select combination of tapered surfaces and extraction features may achieve a desired illumination and appearance. Any combination of these features may be employed by the waveguides 112 of the presently described luminaire/lighting system 100, 104.

According to one aspect, a waveguide directs light into at least one, up to an infinite number, of beams or ray groups, wherein the rays of each group travel through the waveguide within a range of angles relative to one another. Each range may be narrow or broad within the TIR limits of the waveguide material. According to another aspect, a waveguide arranges light into a plurality of groups that bounce at least once inside the waveguide by TIR off one or more surfaces of the waveguide. Each group comprises a plurality of light rays that travel at angles that are disposed within a narrow or broad range of angles relative to one another. In any embodiment, the range may be so narrow that the light rays of ray group may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

Figure 7:
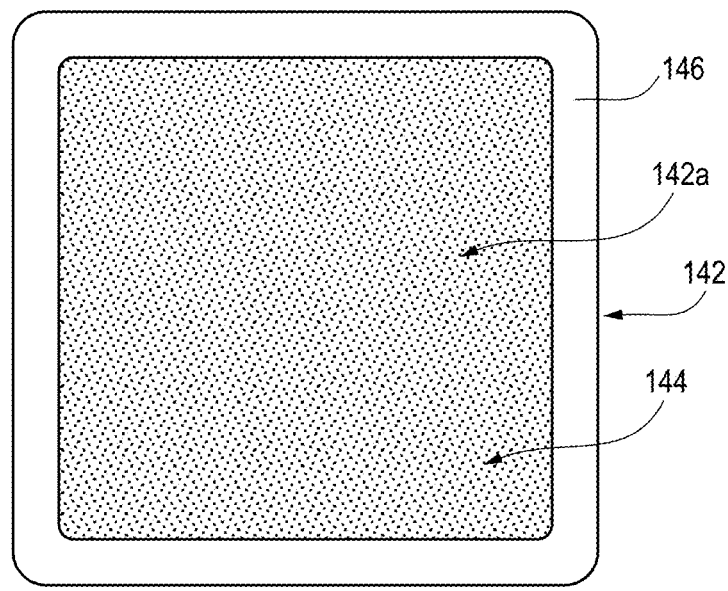
FIG. 7 is a plan view illustrating an extraction feature pattern disposed on a waveguide.

Referring now to FIGS. 7-9A, the optical waveguide(s) 112, which may comprise the first and second waveguides 112a, 112b of the luminaire 100, are depicted such that the extraction features 128 disposed thereon form one or more of the extraction feature patterns 142. An extraction feature pattern 142a shown in FIG. 7 is concentrated at an interior portion 144 of the waveguide 112 while a peripheral portion 146 does not have extraction features disposed thereon. Accordingly, light introduced through one or more of the edge surfaces 124 traverses the peripheral portion 146 such that substantially all of said light is totally internally reflected. Once this edge coupled TIR light reaches the interior portion 144 it is directed out of and/or away from the waveguide by the extraction features 128 of the interior-concentrated extraction feature pattern 142a. Therefore, the waveguide 112 of FIG. 7 primarily emits light from the interior portion 144 thereof. FIG. 10 is a photograph depicting the waveguide 112, having the extraction feature pattern 142a of FIG. 7, with blue and/or violet light (such as light comprising a color temperature of about or greater than 10,000K and preferably about 16,000K) being introduced into the edge surface 124 of said waveguide 112 by LEDs. The illuminated waveguide 112 of this photograph does not emit light from the peripheral portion 146 but does emit light from the interior portion 144 whereon the extraction features 128 are disposed.

Figure 8:
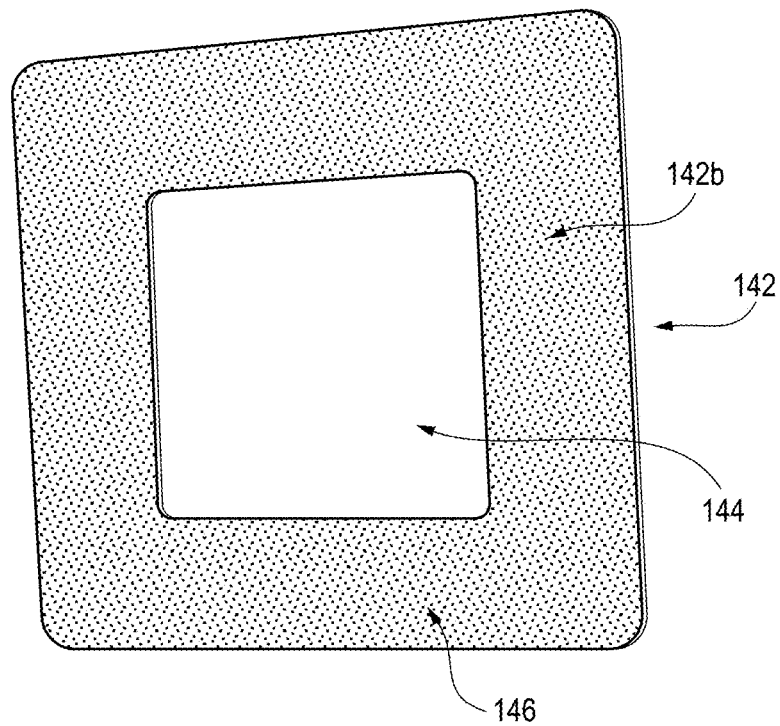
FIG. 8 is an isometric view illustrating another extraction feature pattern disposed on a waveguide.
Figure 11:
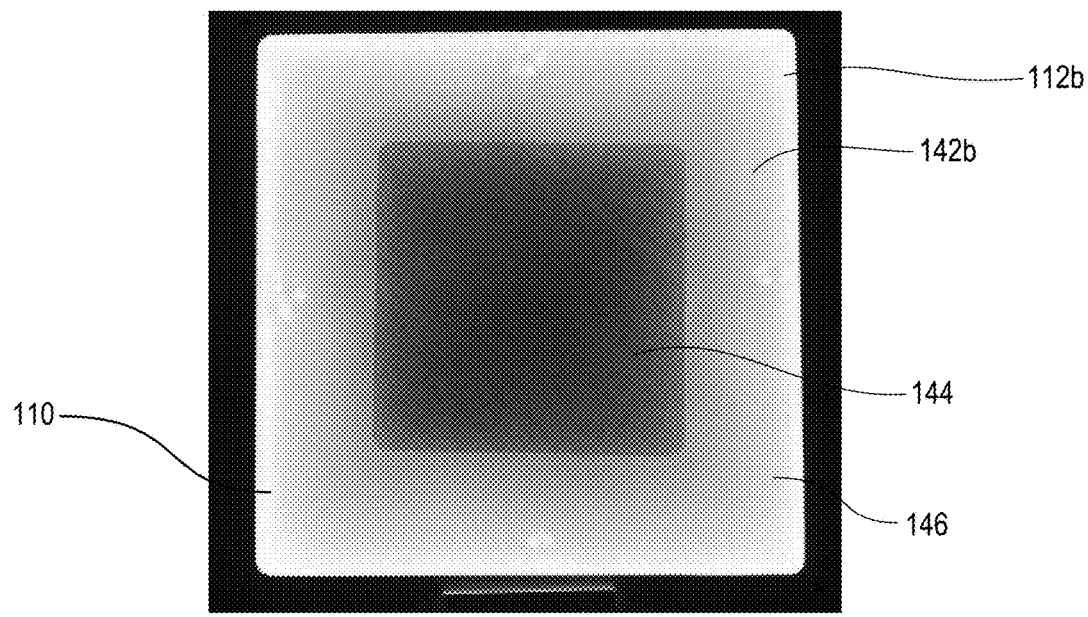
FIG. 11 is a color photograph from above of the waveguide of FIG. 8 lit by one or more yellow and/or warm white LEDs.

FIG. 8 illustrates an embodiment of the optical waveguide(s) 112 comprising another extraction feature pattern 142b. In this extraction feature pattern 142b, the extraction features 128 are concentrated in the peripheral portion 146 of the waveguide 112 while the interior portion 144 of the waveguide 112 does not have extraction features disposed thereon. Therefore, substantially all of the light introduced into the example waveguide 112 of FIG. 8 is directed out of and away from the waveguide by the extraction features 128 in the peripheral portion 146. Edge coupled light that is not extracted before reaching the interior portion 144 may be TIR while traversing the interior portion 144 and subsequently extracted by the extraction features 128 on another side of the waveguide 112 upon reaching same. FIG. 11 is a photograph depicting the waveguide 112, having the extraction features pattern 142b of FIG. 8, with yellow light (such as light comprising a color temperature of about 3000 k) introduced into the edge surface 124 of said waveguide 112 by the LEDs 130. The illuminated waveguide 112 of this photograph emits light from the peripheral portion 146, whereon the extraction features 128 are disposed, but does not emit light from the interior portion 144.

Figure 9A:
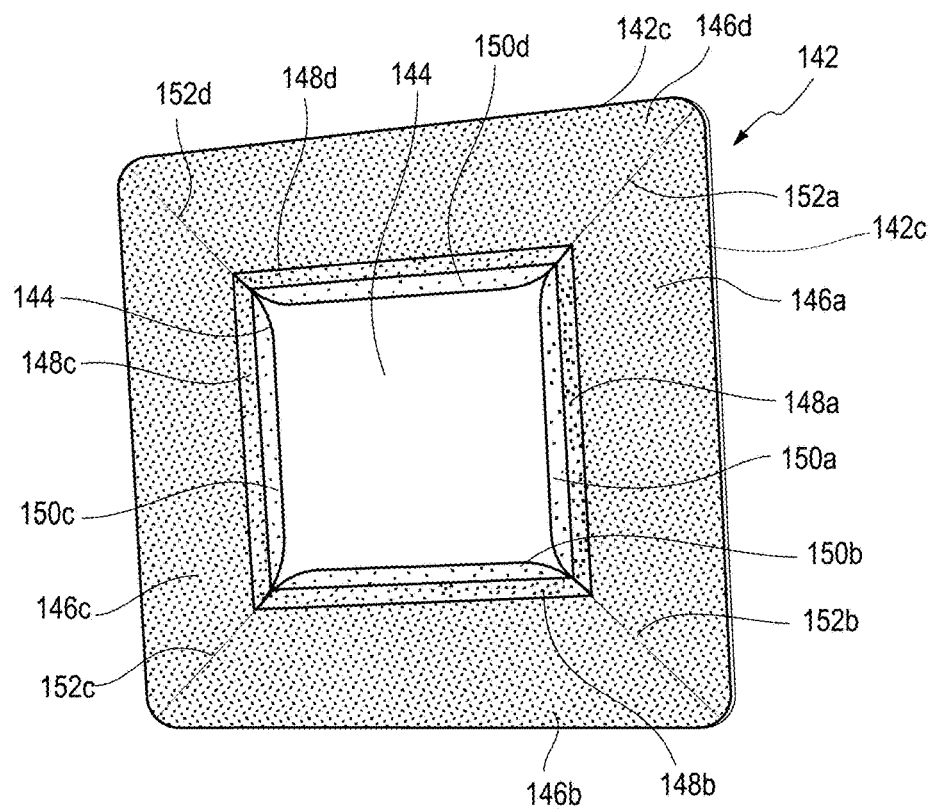
FIG. 9A is an isometric view illustrating another extraction feature pattern disposed on a waveguide.
Figure 10:
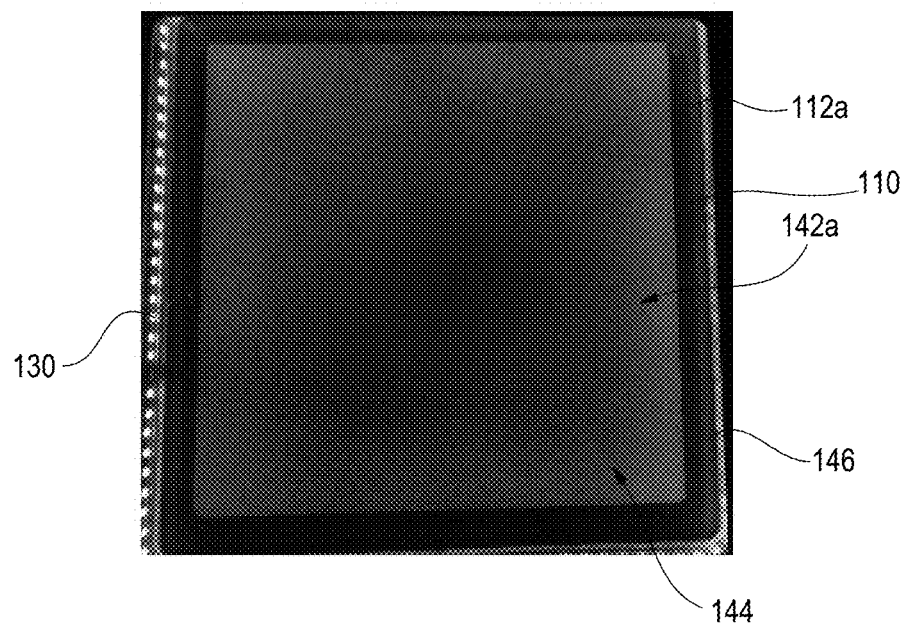
FIG. 10 is a color photograph from above of the waveguide of FIG. 7 lit by one or more blue and/or violet LEDs.

The example embodiment of the optical waveguide 112 shown in FIG. 9A comprises another embodiment of an extraction feature pattern 142c comprising arrangement of the extraction features 128 in the peripheral portion 146 as well as first and second transition portions 148a-148d, 150a-150d. In the extraction feature pattern 142c, the peripheral portion 146 is separated into four peripheral quadrants 146a, 146b, 146c, 146d by boundary lines 152a-152d. The boundary lines 152 extend from each corner of the generally square/rectangular waveguide 112 to define the peripheral quadrants 146 as generally trapezoidal. Associated with and disposed adjacent to each of the peripheral quadrants 146a-146d are the respective first and second transition portions 148a-148d, 150a-150d. The first, intermediate transition portions 148 are disposed between each of the peripheral quadrants 146a-146d and the second, interior transition portions 150a-150d. In example embodiments, the density of the extraction features 128 (or degree of roughening/texturing) may decrease gradually from the peripheral quadrants 146a-146d to the intermediate transition portions 148a-148d to the interior transition portions, 150a-150d. In this embodiment, a relatively larger proportion of light is extracted by the denser extraction feature arrangement of the peripheral quadrants 146a-146d. An intermediate proportion of light, that is relatively less than that extracted by the peripheral quadrants 146a-146d, is extracted by the intermediate transition portions 148a-148d. A still relatively lesser proportion of light, relative the intermediate transition portions 148a-148d, is extracted by the interior transition portions 150a-150d. The interior portion 144 of the waveguide 112 of FIG. 9A does not have extraction features disposed thereon and totally internally reflects light that has been coupled into the waveguide.

Figure 12:
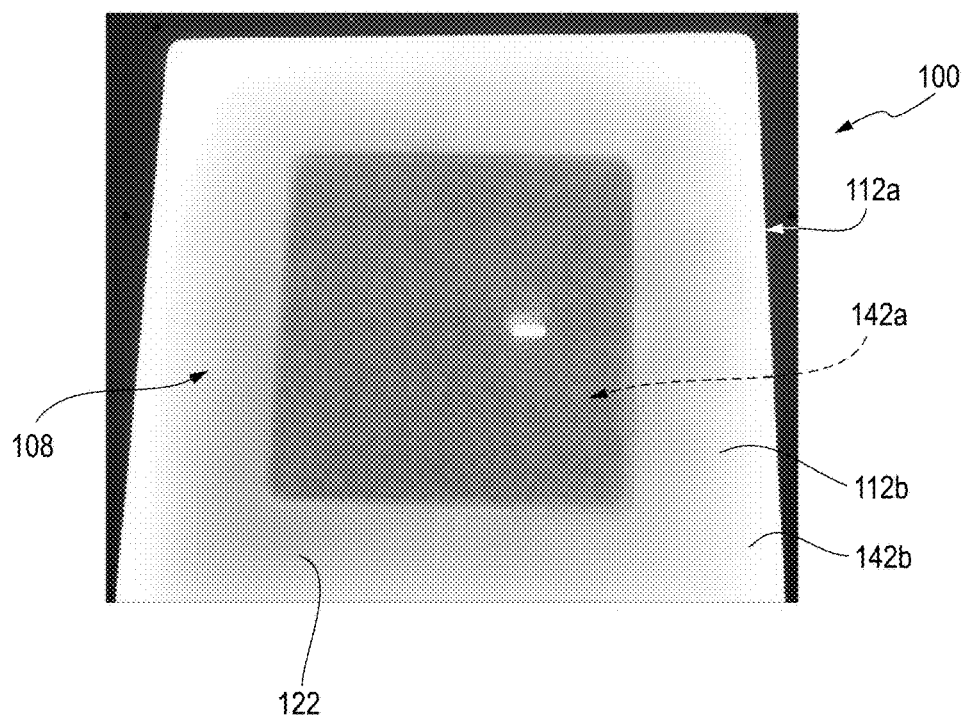
FIG. 12 is a color photograph of the luminaire of the present disclosure comprising the waveguide depicted in FIG. 10 disposed behind the waveguide of FIG. 11.
Figure 13:
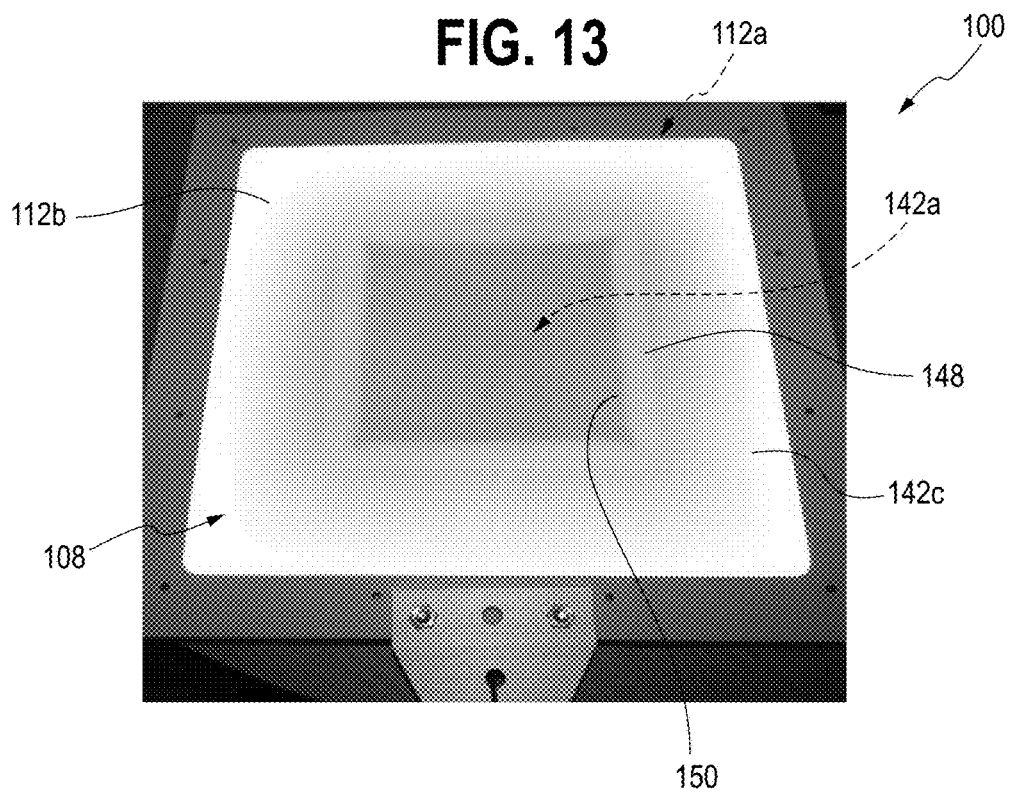
FIG. 13 is another color photograph of the luminaire depicted in FIG. 12.
Figure 14:
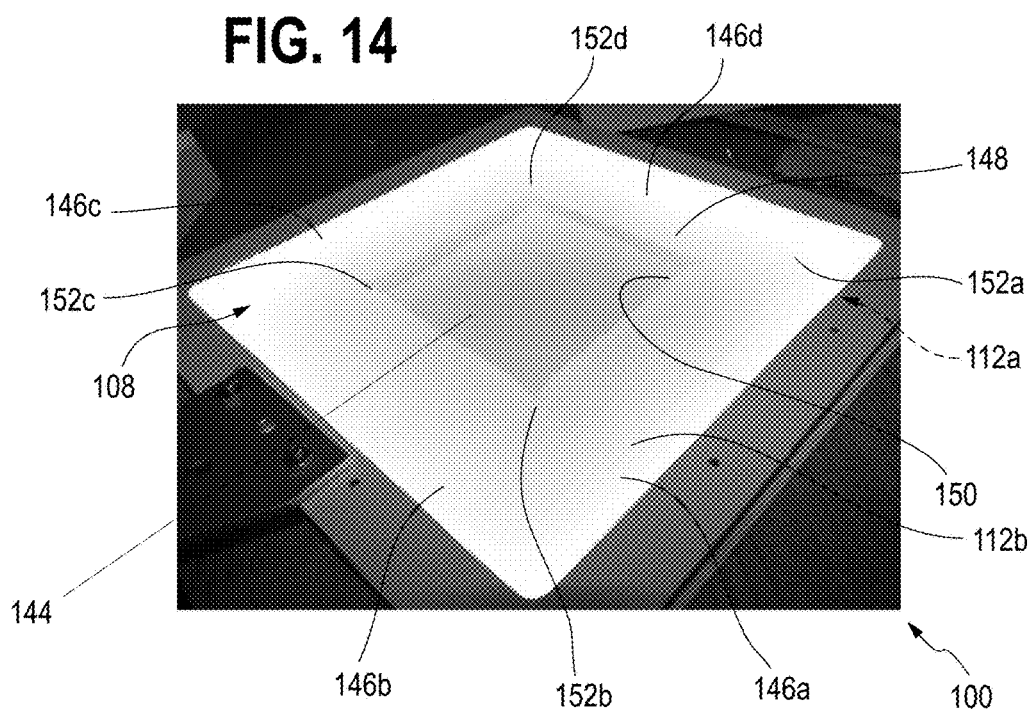
FIG. 14 is another color photograph of the luminaire depicted in FIG. 12.
Figure 15:
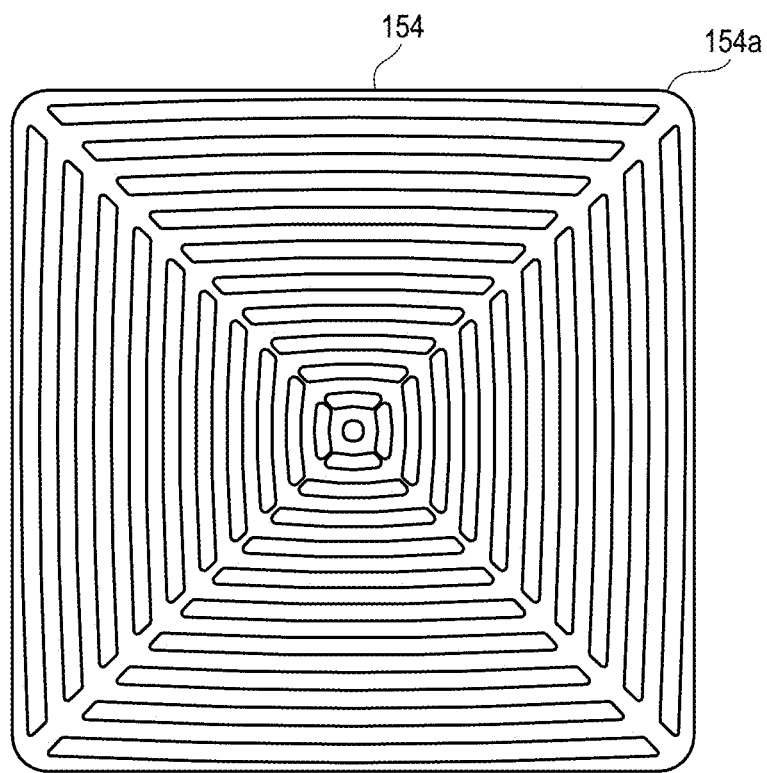
FIG. 15 is a plan view of a mask for fabricating extraction features according to a pattern.
Figure 16:
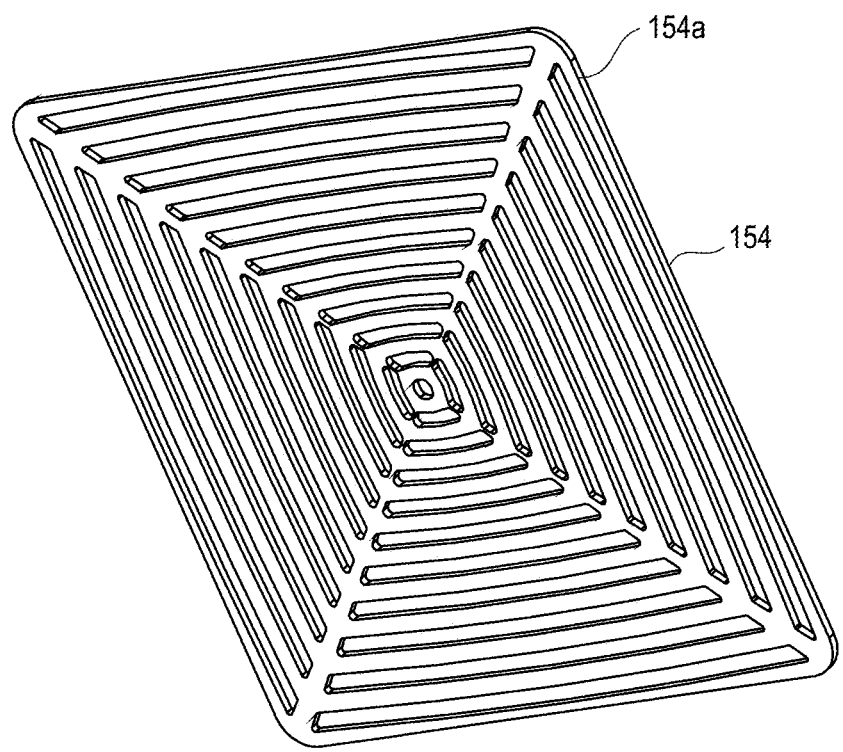
FIG. 16 is an isometric view of the mask of FIG. 15.
Figure 17:
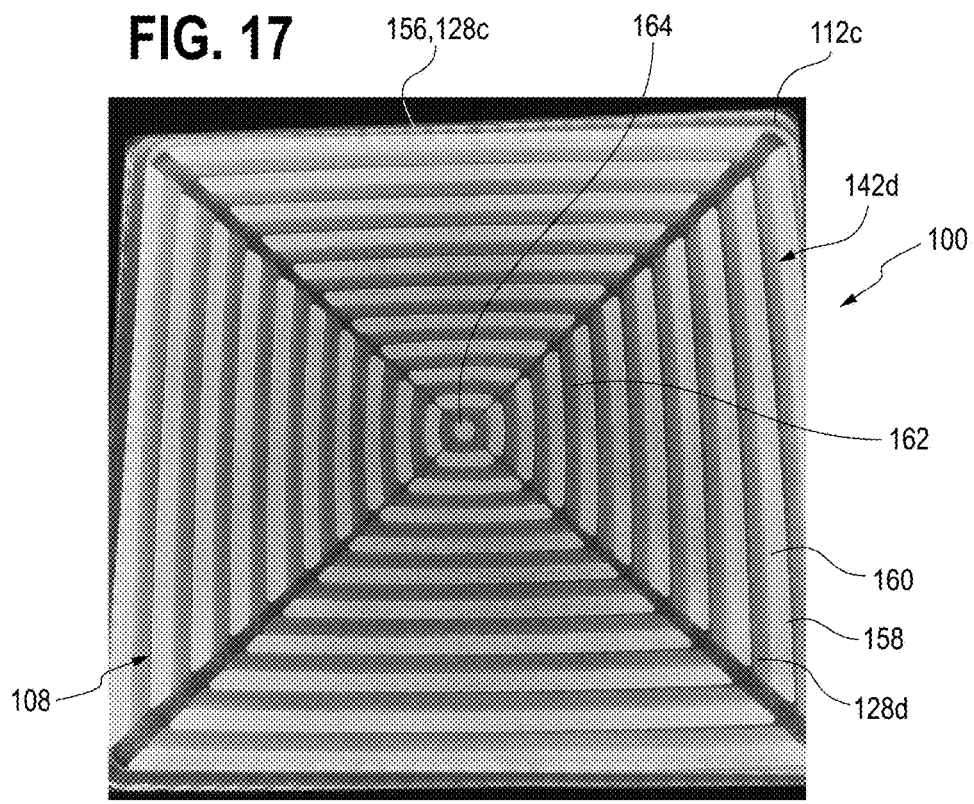
FIG. 17 is a color photograph from above of a waveguide comprising extraction features fabricated with the mask of FIG. 15 and lit by one or more yellow and/or warm white LEDs.

In an example arrangement of the luminaire 100, the first waveguide 112a comprises the extraction feature pattern 142a (FIG. 7) having interior extraction features and the second waveguide 112b comprises one of the extraction feature patterns 142b, 142c with peripheral extraction features (FIGS. 8 and 9). Example embodiments of the luminaire 100 are depicted in the photographs of FIGS. 12-14. The e of the luminaire 100a shown in FIG. 12 comprises first and second waveguides 112a, 112b having respective extraction feature patterns 142a and 142b. In this embodiment, blue and/or violet light (such as light comprising a color temperature of about or greater than 10,000K and preferably about 16,000K) is edge coupled into the first waveguide 112a while yellow light (such as light comprising a color temperature of about 3000 k) is edge coupled into the second waveguide 112b. Light is emitted into an illuminated space, such as a room, through the lower surface 122 of the second waveguide 112b.

The appearance effect 108 produced by this example embodiment is a yellow perimeter, wherefrom light is emitted according to the extraction feature pattern 142b of the second waveguide 112b, disposed about a blue/violet interior, wherefrom light is extracted by the extraction feature pattern 142a of the first waveguide 112a. The blue/violet light emitted from the lower surface 116 (FIG. 3) of the first waveguide 112a enters the upper surface 120 (FIG. 3) of the second waveguide 112b, passes therethrough relatively unobstructed, and is emitted from the lower surface 122 of the second waveguide 112b. The photographed embodiment produces the appearance effect 108 of a skylight such that an occupant of the illuminated space perceives a desirable yellow light emitted from a blue sky illusion/appearance.

In general, the luminaire(s) 100 is configured to emit light and provide the appearance of the sky to a viewer. For the concepts contemplated by the present disclosure, the luminaire(s) 100 are configured to emulate sunlight coming through a skylight directly at a particular angle or being reflected off of a sidewall. Accordingly, the luminaire(s) 100 may be arranged to provide generally non-directional light associated with the sky as well as emulate the direct sunlight or a reflection thereof from the sun. Depending on the time of day or night, the intensity, color temperature, and/or color of light emitted from the luminaire(s) 100 may vary in an effort to emulate the light provided by a conventional skylight at different times of the day or night and any transitions therebetween.

Figure 9B:
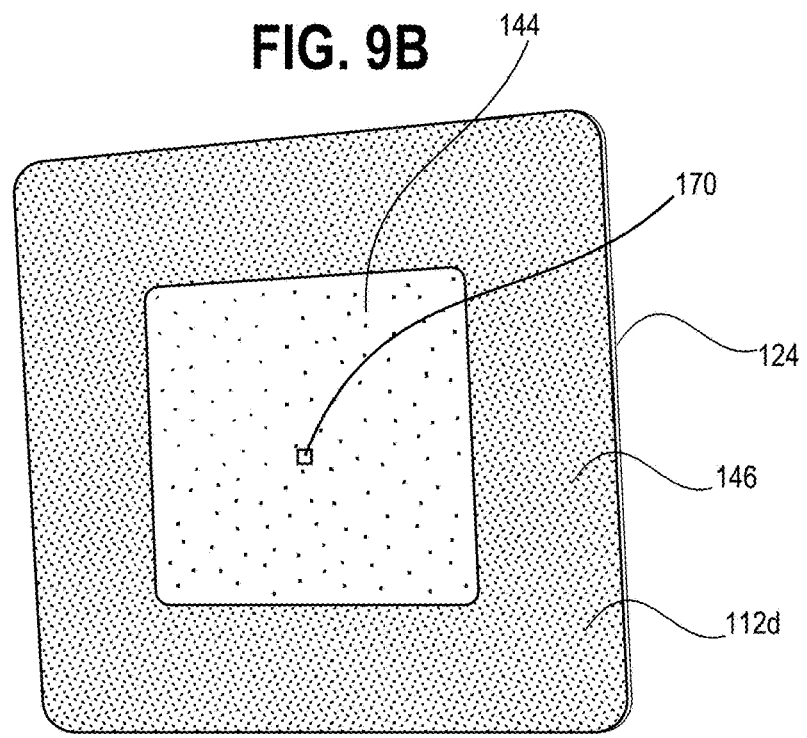
FIG. 9B is an isometric view illustrating another extraction feature pattern disposed on a waveguide.

Referring back to FIG. 9B, an example embodiment of a waveguide 112d is depicted. The waveguide 112d comprises both the interior and peripheral extraction feature patterns 142a, 142b. The LEDs 130 may be coupled to the edge 124 as well as disposed in the interior coupling cavity 170. Light from the LED(s) 130 disposed in the interior coupling cavity 170 is directed out of the waveguide 112d by the interior extraction feature pattern 142a. Light from the LED(s) 130 disposed along the edge 124 of the waveguide 112d is directed out of the waveguide 112d by the peripheral extraction feature pattern 142b. The LED(s) 130 at the interior coupling cavity 170 and the waveguide edges 124 may couple into the waveguide 112d light of the same or different spectrums, colors, correlated color temperatures (CCT), and/or other light qualities. Therefore, the light extracted by the interior and peripheral portions 144, 146 may have different spectrum qualities and/or different directional components. Any of the extraction feature patterns 142 described herein may be combined on a single waveguide, such as is shown in FIG. 9B. The luminaire(s) 100 may comprise a single waveguide that emits light similar to and/or in accordance with embodiments described herein as comprising two waveguides. Further, in FIG. 9B the extraction features 128 in the respective interior and exterior portions 144, 146 may be the same or different. One or more specular barriers, grooves, and/or other characteristics of the waveguide body 110 may separate extraction feature patterns 142 when disposed on the same waveguide 112. Embodiments described hereinthroughout may extract light comprising a first spectrum from one portion of a waveguide body and light comprising a second spectrum from another portion of the waveguide body. Light from light sources comprising different spectrums (or other characteristics) may or may not be mixed within the waveguide body 100 before extraction to achieve the desired appearance effect 108.

In the embodiments of the luminaire 100 shown in FIGS. 13 and 14, the first waveguide comprises the extraction feature pattern 142a (FIG. 7) having interior extraction features, and the second waveguide 112b comprises the extraction feature pattern 142c (FIG. 9A) having peripheral quadrants 146a-146d, boundary lines 152a-152d, and first and second transition portions 148a-148d, 150a-150d. With similarity to FIG. 12, the appearance effect 108 of a yellow perimeter disposed about a blue/violet interior is developed. In the photographed embodiment of FIGS. 13 and 14, the first and second transition portions 148a-148d, 150a-150d, which comprise relatively fewer extraction features 128 as compared with the peripheral quadrants 146a-146d, operate to extract some yellow light while also permitting some blue/violet light, emitted from the first waveguide 112a, to pass therethrough. Accordingly, the transition surfaces 148a-148d, 150a-150d, in conjunction with the boundary lines 152a-152d develop a perception of depth when viewed by a user occupying the illuminated space. This may further complement the appearance effect 108 of a skylight. As desired, the luminaire 100 produces the illusion of depth in a relatively thin, flat luminaire construction utilizing two waveguides configured and aligned one atop/behind the other.

In example embodiments, a material may be disposed between the first and second waveguides 112a, 112b. The material may be specular or otherwise suitably reflective and/or absorptive. The material between the waveguides 112a, 112b may prevent light extracted out of the first waveguide 112a from portions of the waveguide 112a comprising an extraction pattern that overlaps with portions of the second waveguide that also comprise an extraction pattern. For example, the extraction feature pattern 142a may overlap with the extraction feature pattern 142b. In this example, the material disposed between the first and second waveguides 112a, 112b may prevent undesirable light/color mixing at the overlapping edges of the first and second extraction feature patterns 142a, 142b.

Referring now to FIGS. 15-23, example embodiments of the luminaire 100 comprise patterns on the waveguide surface that utilize geometrical, linear, and/or curved shapes to develop the perception and/or illusion of a vanishing point. The appearance effects 108 shown in the photographs of the luminaire 100 in FIGS. 17-19, 21, and 22 produce the illusion of depth on a substantially flat, light emitting surface of the waveguide 112. FIGS. 15, 16, 20, and 23 depict mask elements 154 that may be used to produce extraction feature patterns 142 on the waveguides 112. The mask element 154a of FIGS. 15 and 16 produces the extraction feature pattern 142d used to develop the appearance effect 108 of FIGS. 17-19. The mask element 154b of FIG. 20 may be used to product the extraction feature pattern 142e that develops the appearance effect 108 of FIGS. 21 and 22. The mask element 154c of FIG. 23 may produce yet another extraction feature pattern that results in the illusion of depth when viewed by an occupant of a space illuminated by the luminaire 100.

Figure 18:
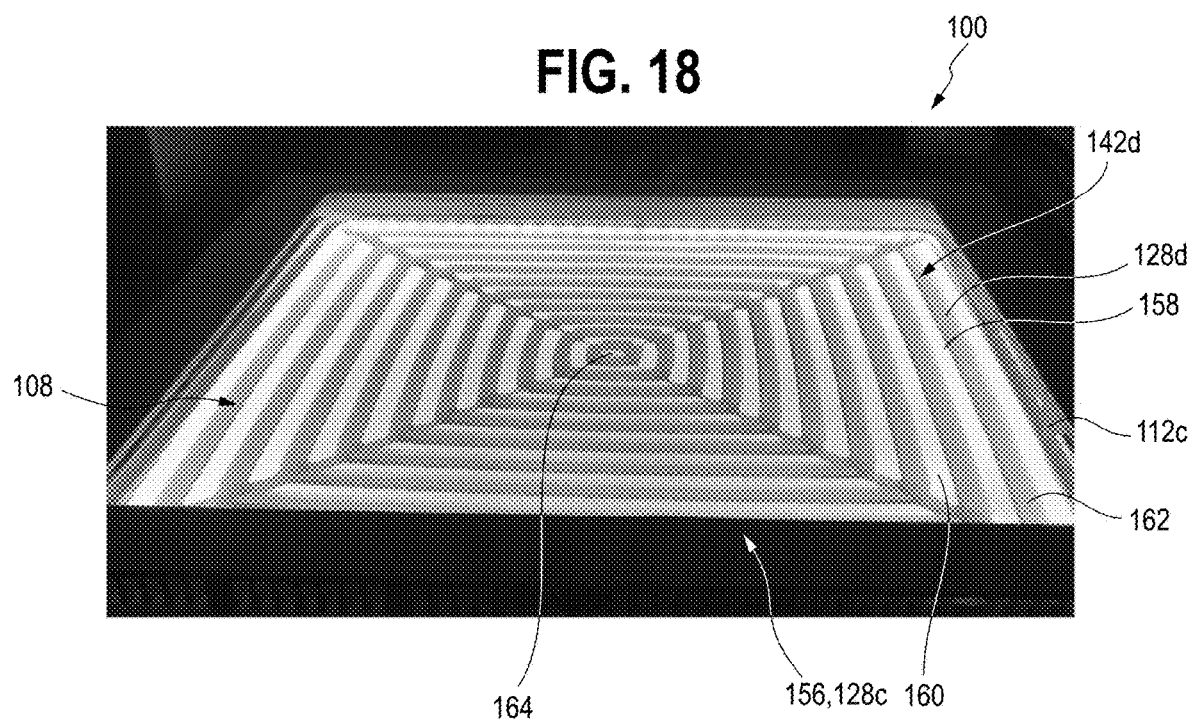
FIG. 18 is another color photograph from above and to the side of the waveguide lit by one or more yellow and/or warm white LEDs of FIG. 17.
Figure 19:
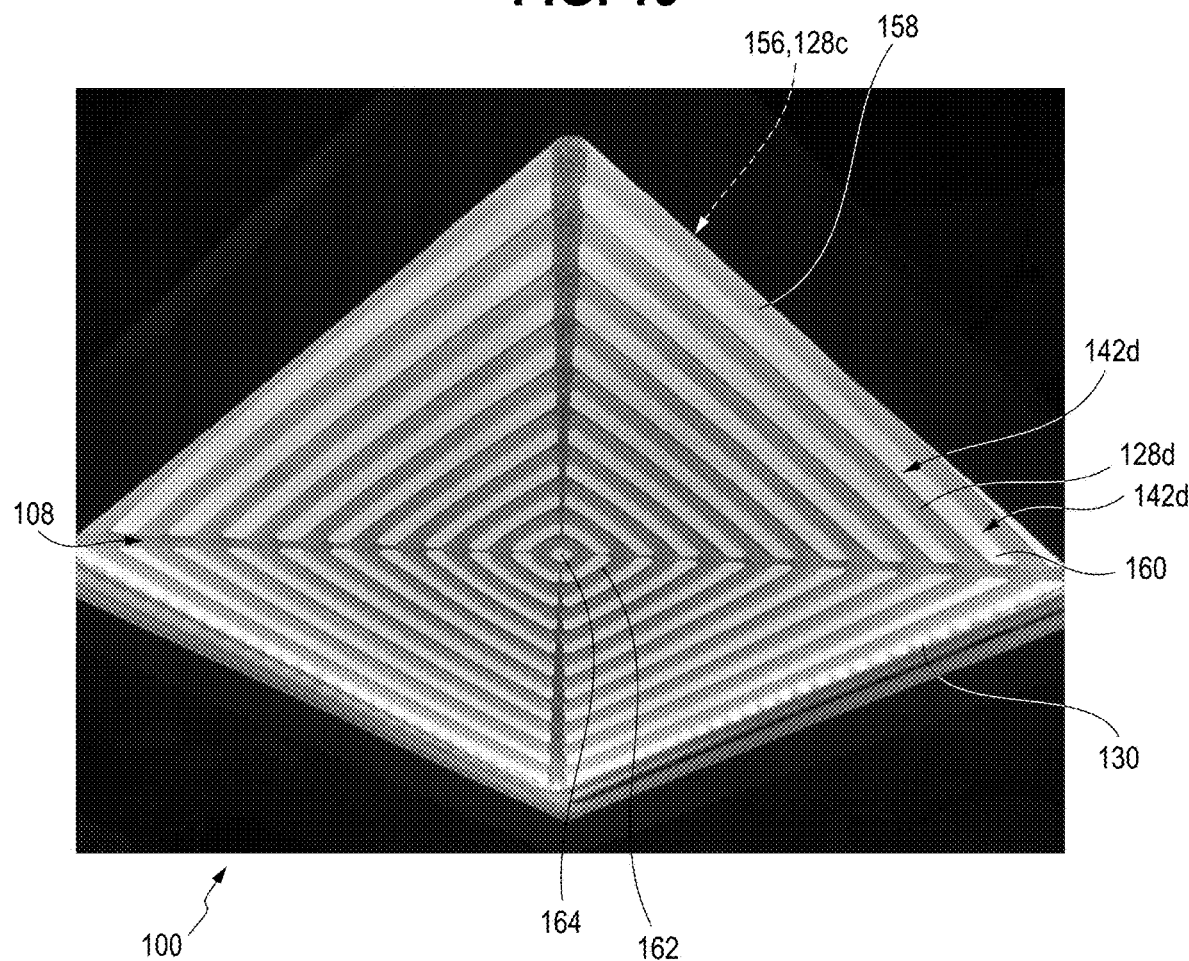
FIG. 19 is another color photograph from above and to the side of the waveguide lit by one or more yellow and/or warm white LEDs of FIG. 17.
Figure 20:
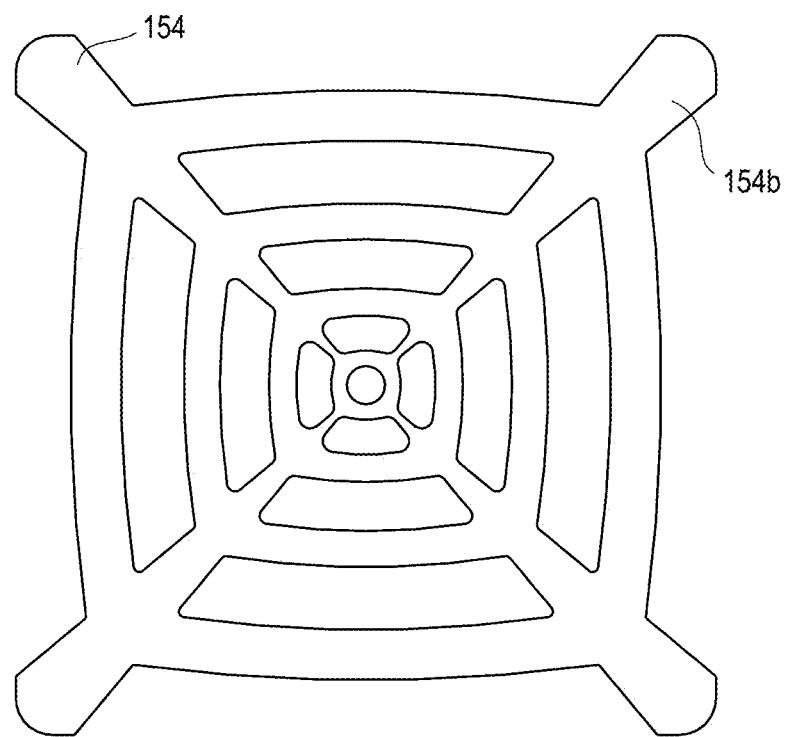
FIG. 20 is a plan view of a mask for fabricating extraction features according to a pattern.

In example embodiments, the extraction feature patterns 142 may include extraction features on both sides of the waveguide 112 and/or the extraction features 128 disposed at various portions of the waveguide 112 may direct light out of the waveguide in different directions. In the example embodiment of the luminaire 100 shown in FIGS. 17-19, only one waveguide 112c is used to produce the illusion of depth. The mask element 154a may be used in fabricating the extraction features 128 disposed on upper and/or lower surfaces 156, 158 of the waveguide 112c. The waveguide 112c of this embodiment may have on the upper surface 156 thereof upper surface extraction features 128c that extract/direct proportionally more light out of the lower surface 158 of the waveguide 112c thereby developing bright portions 160 wherefrom relatively more light emanates. The lower surface 158 of this waveguide 112c may have complementary lower surface extraction features 128d that extract relatively less light out of the lower surface 158 of the waveguide 112c as compared to the upper surface extraction features 128c thereby developing dimmer portions 162. The complementary arrangement of the bright portions 160 and the dimmer portions 162 develops the appearance effect 108 of a vanishing point 164 disposed proximal a center of the waveguide 112c shown in FIGS. 17-19. In example embodiments, the upper and lower extraction features 128c, 128d may be arranged such that the vanishing point 164 is disposed elsewhere on the waveguide 112c when viewed by the occupant of an illuminated space. For example, the vanishing point 164 may be nearer a corner of the waveguide 112c. As shown in the photographs of FIGS. 18 and 19, the appearance effect 108 produced by this embodiment allows the bright and dimmer portions 160, 162 to complement and interact with one another in desirable ways when viewed from different angles.

Figure 21:
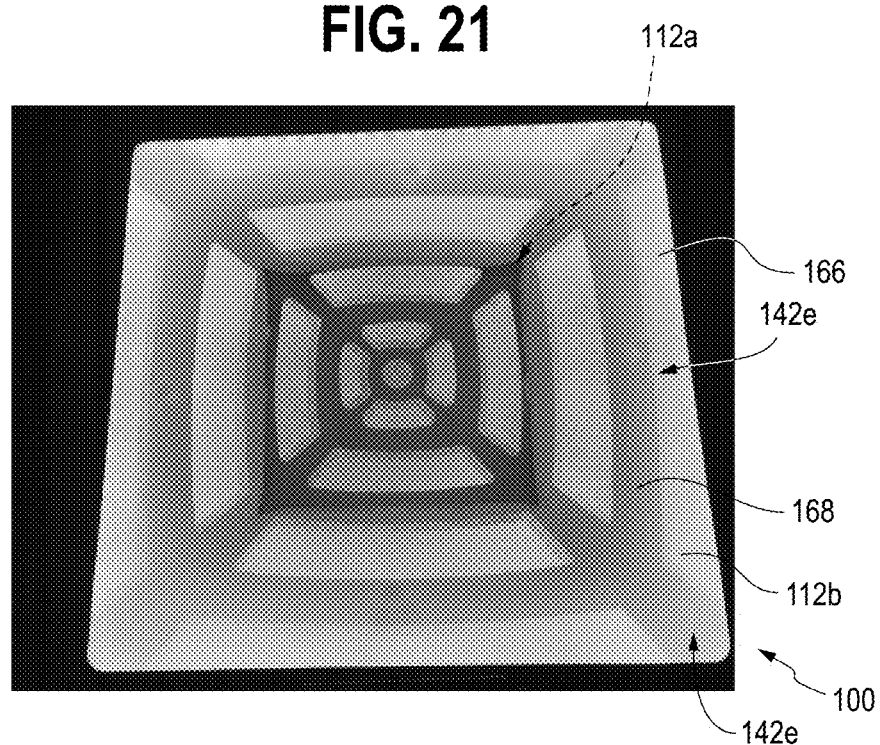
FIG. 21 is a color photograph from above of a waveguide comprising extraction features fabricated with the mask of FIG. 20 and lit by one or more yellow and/or warm white LEDs.
Figure 22:
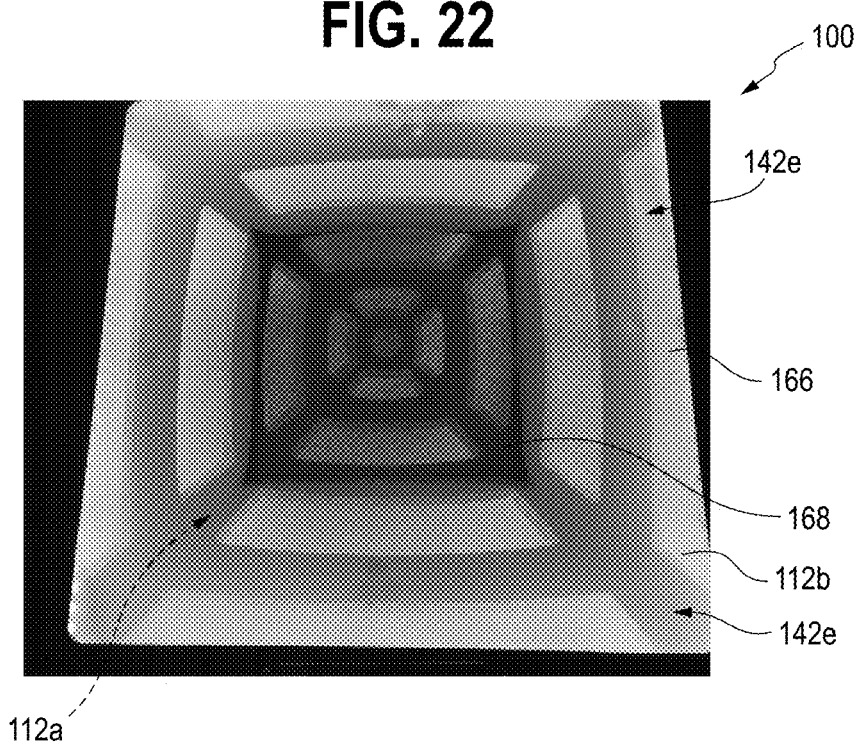
FIG. 22 is a color photograph from above of a luminaire comprising the waveguide depicted in FIG. 10 disposed behind the waveguide depicted in FIG. 21.
Figure 23:
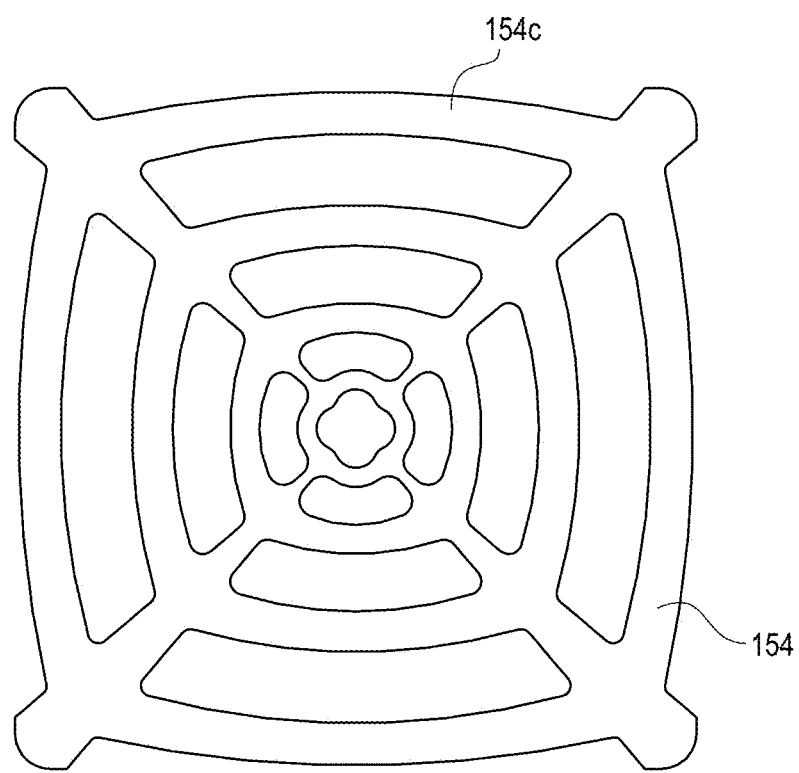
FIG. 23 is a plan view of a mask for fabricating extraction features according to a pattern.

Also in example embodiments, such as are shown in the photographs of FIGS. 21 and 22, the extraction feature patterns 142 disposed on the first and second waveguides 112a, 112b may be arranged to develop bright portions 166 and dimmer portions 168 that are further enhanced by color selection of the edge coupled LEDs 130 respectively associated with the first and second waveguides 112a, 112c. For example, the lower waveguide 112b depicted in FIG. 21 and having an extraction feature pattern 142e fabricated with the mask element 154b may be operatively paired with the upper waveguide 112c depicted in FIG. 9A. In such an embodiment, the violet light emitted by the upper waveguide 112a may further enhance the illusion of depth and appearance of a vanishing point 164 produced by the bright and dimmer portions 166, 168 of the second waveguide 112b, as shown in FIG. 22.

In example embodiments, a plurality of the luminaires 100 such as those shown in FIGS. 17-19, 21, and 22 with vanishing points 164 at the same or different positions relative the viewer/occupant may line a ceiling or hallway to develop desirable artistic, aesthetic, and/or architectural concepts. The colors and extraction feature patterns disposed on each waveguide of such a configuration of plural luminaires may be customized/selected to highlight or enhance some portion of the illuminated space, interior and/or exterior architecture, and/or otherwise produce desirable overall visual effects or patterns. The luminaire(s) 100 may operate as a primary light source or as a decorative/architectural element complementary to other existing functional and/or decorative luminaires.

As noted, embodiments of the luminaire 100 may be configured the same or differently with respect to the lighting capabilities and characteristics thereof. In order to meet the specifications of particular applications, the luminaire(s) 100 may be designed to operate at different intensity levels, colors, color temperatures, light distributions, illumination patterns, and/or other lighting characteristics. Further, more than one of the luminaire(s) 100 may be designed and/or controlled such that each panel provides light with different characteristics, yet the light from the overall lighting system 104 combines to provide light with characteristics that may be different from the individual luminaire(s) 100 of the system 104.

In example embodiments, the luminaire(s) 100 may emulate the directional nature of sunlight passing through a conventional skylight, such as during different times of day with corresponding sun positions. The luminaire(s) 100 may be arranged to emulate the appearance of the sky and the non-directional nature of sunlight passing through a conventional skylight. The luminaire(s) 100 may be further configured to emulate the appearance of light passing through or being reflected from window and side walls of a conventional skylight.

Also in embodiments contemplated by this disclosure, the light exiting one or more portions of the luminaire(s) 100 may be relatively shifted toward blue in the light spectrum to emulate the appearance of a blue sky. The light exiting one or more other portions of the luminaire(s) 100 may be relatively shifted toward red in the light spectrum to better emulate the appearance of sunlight. The luminaire(s) 100 may be configured to vary the color, illumination pattern, and/or intensity of emitted light during operation to emulate, track, and/or react to changing conditions of outside environments throughout the day and night. For example, it may be desirable for the luminaire(s) 100 to emulate the appearance effect 108 of blue sky and sunlight during night time and/or during weather events, e.g., cloudiness or fog. Also, embodiments may emulate a conventional skylight during predominately daylight hours between, but not necessarily including, the sunrise and sunset where the sky may appear less blue and more reddish orange. To expand the functionality of the luminaire(s) 100 to better emulate the appearance of a conventional skylight outside of daylight hours, operation in expanded color spaces and/or with more or less color mixing may be desirable. For example, the colors emitted by the luminaire(s) 100 may be shifted or expanded to address the deeper blues associated with dusk, dawn, and nighttime as well as the more reddish orange and red hues associated with sunrise and sunset.

In example embodiments, the LEDs 130 are coupled to one or more portions of the optical waveguide(s) 112. As mentioned hereinabove, the LEDs 130 may be disposed as strings or groups. Each string or group of LEDs 130 may comprise one color or more than one color of LEDs. A two-color LED string may comprise a plurality of LEDs of a first color and a plurality of LEDs of a second color. Therefore, the color and number of the LEDs 130 may be varied to introduce an overall color into the waveguide body 110 that is a combination of the color produced by the individual LEDs 130 of an LED string or group. The overall spectrum of light introduced into the waveguide body 110 may be controlled by the combination of LEDs selected and/or the extent to which the different LEDs are energized.

Figure 25:
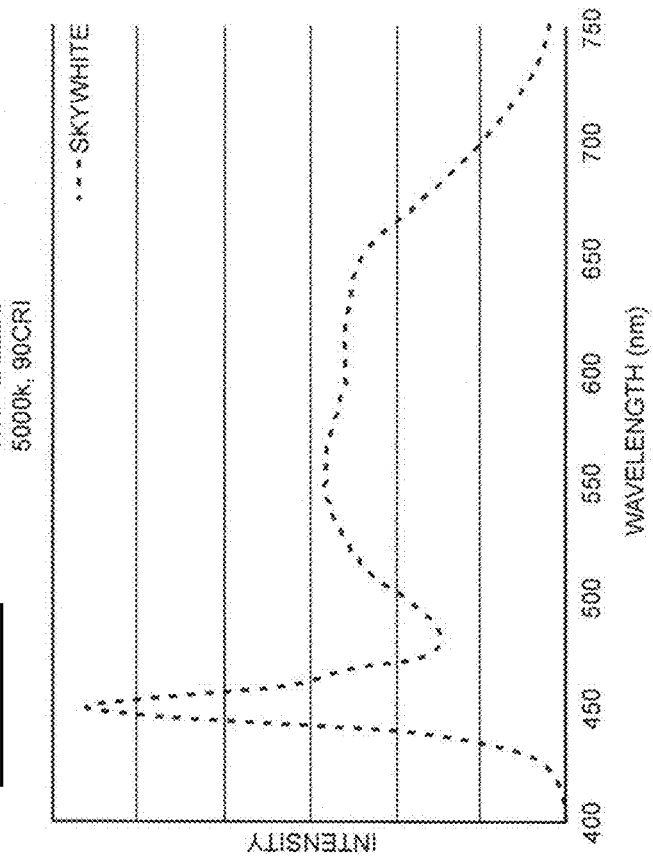
FIG. 25 is a graph of the emission spectrum for a white LED for use with embodiments.
Figure 24:
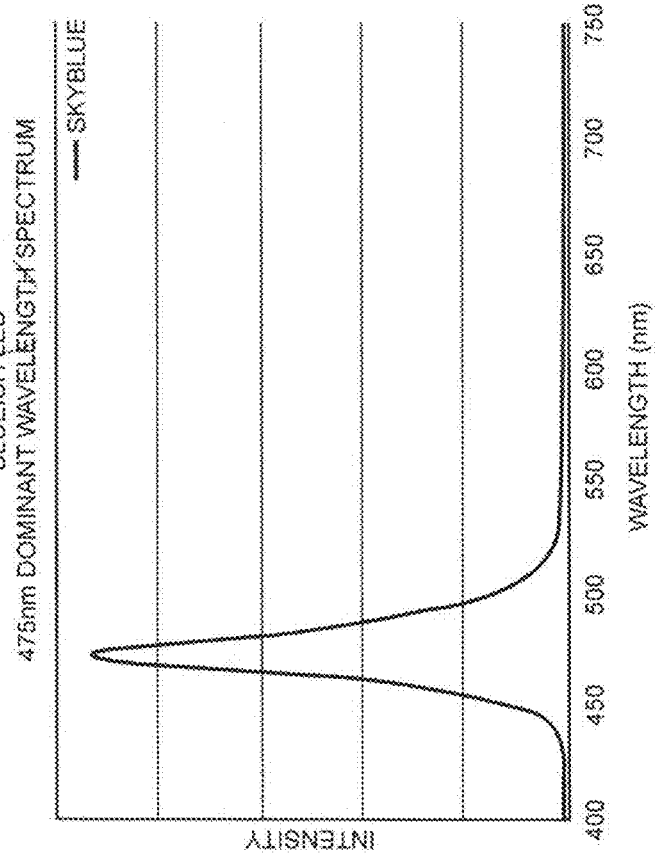
FIG. 24 is a graph of an emission spectrum for a bluish LED for use with embodiments.

For example, the LEDs 130 introducing light into a portion of the waveguide body 110 may be bluish LEDs that emit bluish light comprising a 475 nm dominant wavelength and an overall bluish spectrum illustrated in FIG. 24, which is a graph of output intensity versus wavelength. Further, the LEDs 130 may be white LEDs that emit white light comprising a color temperature of approximately 5000K (+/−0.5, 1, 2, or 5%) and a color rendering index (CRI) of at least 85 or 90 (i.e. CRI 85, CRI 90). Example white LEDs may emit an overall spectrum that is illustrated in FIG. 25, which is a graph of output intensity versus wavelength.

Figure 27:
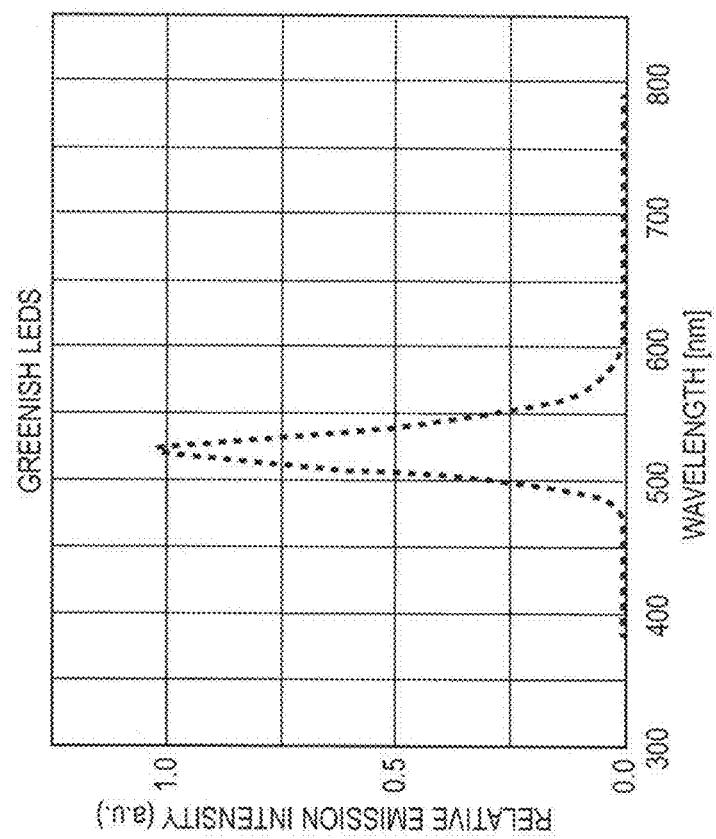
FIG. 27 is a graph of the emission spectrum for a greenish LED for use with embodiments.
Figure 26:
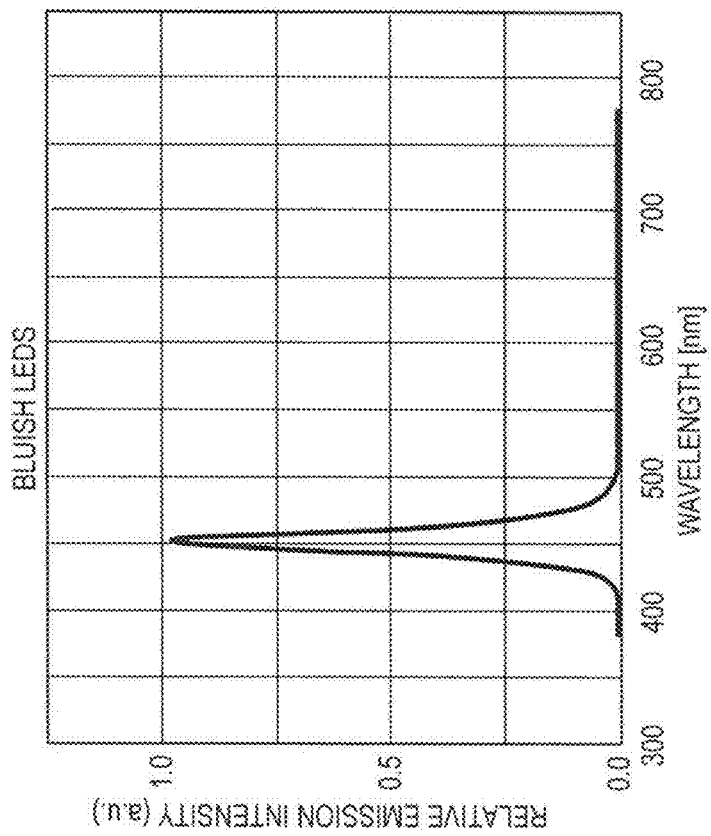
FIG. 26 is a graph of the emission spectrum for a bluish LED for use with embodiments.
Figure 28:
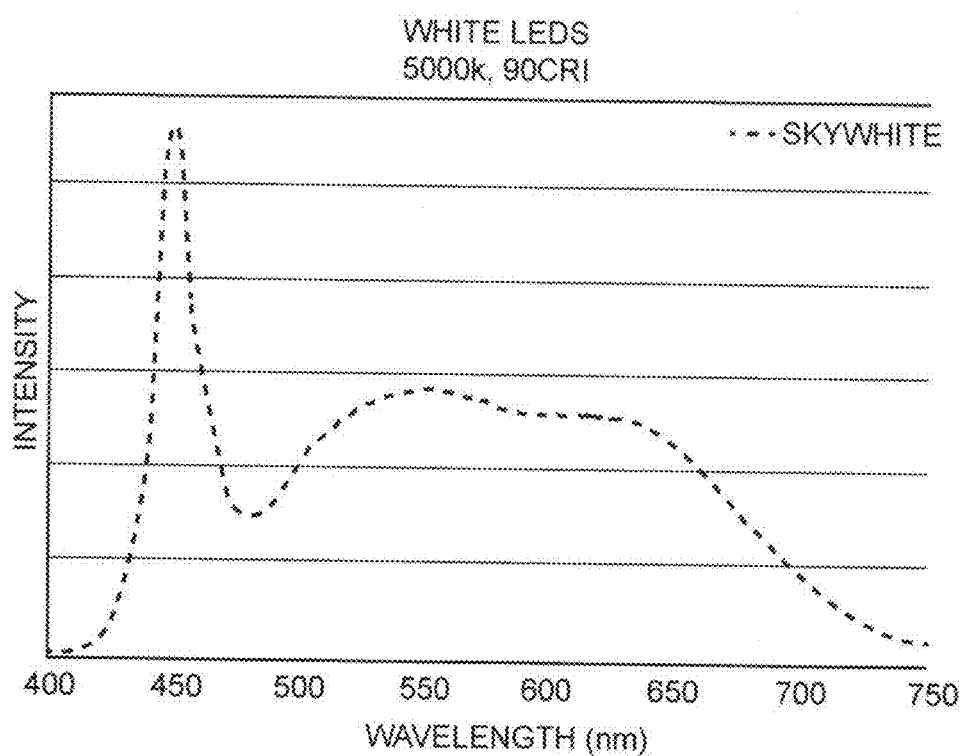
FIG. 28 is a graph of the emission spectrum for a white LED for use with embodiments.

In example embodiments, the overall spectrum of the emitted light from the luminaire(s) 100 may be increased by using three or more LEDs comprising different colors. Using three or more colors of the LEDs 130 may be desirable for creating complex light that increases the accuracy with which the luminaire(s) 100 emulate sunlight. An example of a three color-LED combination may comprise deeper bluish LEDs, greenish LEDs, and white LEDs. Example bluish LEDs may comprise a 418 nm dominant wavelength and an overall spectrum (primary spectrum of 505 nm-530 nm) that is illustrated in FIG. 26, which is a graph of output intensity versus wavelength. Example greenish LEDs may comprise a 458 nm dominant wavelength and an overall spectrum (primary spectrum of 450 nm-465 nm) that is illustrated in FIG. 27, which is a graph of output intensity versus wavelength. Example white LEDs may comprise a color temperature of approximately 5000K (+/−0.5, 1, 2, or 5%) and a color rendering index (CRI) of at least 85 or 90 (i.e. CRI 85, CRI 90). Also, example white LEDs may comprise an overall spectrum that is illustrated in FIG. 28, which is a graph of output intensity versus wavelength. While certain colors of LEDs are used in the described embodiments, LEDs of various colors and combinations thereof are considered within the scope of the disclosure. A three color LED combination of the above-mentioned example LEDs may supply light to the first waveguide 112*a* and/or the interior portion 144 of a single waveguide embodiment of the luminaire(s) 100.

As noted hereinabove, the respective portions 144, 146 and/or the respective waveguides 112*a*, 112*b* of the luminaire(s) 100 may be individually controlled such that light introduced therein and emitted thereby may be of different colors or spectrums at any selected time. The particular spectrums and/or colors for particular portions and/or waveguides may be permanently fixed or dynamically controlled such that the appearance effect(s) 108 produced by the emitted light may change based on user input, a predefined program, and/or as a function of any number or combination of control inputs/variables. The control inputs may include date, day, time of day, sensor outputs (such as indoor and/or outdoor temperature sensors, light sensors, motion sensors, humidity sensors, rain sensors, and/or other suitable sensors), architectural/structural qualities of the building in which the luminaire(s) 100 is disposed, and/or other suitable control inputs.

The luminaire(s) 100 may be further controlled such that the composite lighting output produced thereby supplies a certain color, color temperature, CRI, and/or otherwise suitable light while achieving other lighting goals, such as emulating a conventional skylight, developing a depth effect, creating a vanishing point, enhancing room aesthetics, highlight architectural features, and/or other suitable lighting goals.

A networked plurality of the luminaire(s) 100 may be controlled collectively by a remote source, by a master fixture, or in a distributed fashion to operate in concert to present a static or dynamic scene. Each of the luminaire(s) 100 may have different or the same light output depending on the desired scene lighting. In one scenario, each of the luminaire(s) 100 may provide the same light output for a scene, such that each of the luminaire(s) 100 comprises the same appearance effect 108 for a uniform scene. In another scenario, two or more of the luminaire(s) 100 comprise different light output configurations, wherein each of the luminaire(s) 100 represents a portion of an overall scene. The luminaire(s) 100 may also be controlled to provide virtually any type of mood, theme, holiday, and/or like lighting as well wherein the color, color temperature, brightness, and spectral content of the light emitted from the luminaire(s) 100 is fully customizable through selection of the light sources and the control thereof. The luminaire(s) 100 may be controlled or configured to operate in different modes at different times or in response to sensor input or outside control input.

For example, the luminaire(s) 100 may function to emulate a conventional skylight with a changing scene that tracks outside conditions during business hours and transitions to decorative accent lighting mode during non-business hours. Alternatively, the luminaire(s) 100 may transition to a mode that enhances alertness or provides some other type of circadian stimuli after normal business hours. Again, such control may be provided by a programming of the luminaire(s) 100, remote control, and/or control based on various inputs from other sensors and controls. The independent control and the potential for different capabilities and configurations of the luminaire(s) 100 provide flexibility and customization for a luminaire, waveguide, and/or waveguide assembly emitting different spectrums of light from discrete portions thereof. The luminaire(s) 100 described herein may include the control, functionality, and/or LED/color point combinations disclosed in copending U.S. Patent Application Publication Nos. 2018-0252374A1 and 2018-0259140A1, both entitled "Skylight Fixture," and filed contemporaneously with the present application, the disclosures of which are hereby incorporated by reference herein.

In an example embodiment, the light source(s)/LEDs 130 may comprise three (or more) LED types such that the light emitted by the luminaire(s) 100 may be precisely controlled a in two-dimensional color space (e.g. to stay on the black body locus at any achievable CCT value). In other embodiments, the color gamut of the selected LED types may have a range such that the achievable CCT/color range is correspondingly larger. In particular, the choice of warm white LEDs in the luminaire(s) 100, including but not limited to BSY+BSY+RDO combinations such as are found in Cree True White fixtures ("BSY" is a blue-shifted yellow LED; and "RDO" is a red-orange LED corresponding to light emitted with a dominant wavelength between 600 nm and 630 nm). For example, it may be desirable for the luminaire(s) 100 to produce light comprising a color similar to natural light around sunset, which may have a low CCT (<2700K).

Any of the embodiments disclosed herein may include a power circuit that may further be used with light control circuitry that controls color temperature of any of the embodiments disclosed herein in accordance with viewer/occupant input such as disclosed in U.S. Patent Application Publication No. 2015-0351187A1, entitled "Lighting Fixture Providing Variable CCT" by Pope et al., the disclosure which is hereby incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. Pat. No. 8,975,827, entitled "Lighting Fixture for Distributed Control" or U.S.

Provisional Application No. 61/932,058, filed Jan. 27, 2014, entitled "Enhanced Network Lighting" both owned by the assignee of the present application and the disclosures of which are hereby incorporated by reference herein. More generally, the control circuitry includes at least one of a network component, an RF component, a control component, and a sensor. The sensor may provide an indication of ambient lighting levels thereto and/or occupancy within the illuminated area. Such sensor may be integrated into the light control circuitry and may cause the luminaire to adjust output lighting levels as a function of ambient light levels and/or detected motion.

INDUSTRIAL APPLICABILITY

In summary, the luminaire contemplated hereinabove may be relatively thin and conducive to surface mounting and/or mounting within ceilings and/or walls with very thin plenums, e.g., 4-6 inches, by using one or more flat, planar waveguides to deliver light. Skylights comprising waveguides may improve the ease of manufacture, power efficiency, and decrease material and manufacturing costs associated with producing other skylights and/or skylight replacement-type fixtures. A dual waveguide luminaire comprises one waveguide that is edge coupled with LEDs to produce a predominantly blue light emulating a blue sky and a second separate waveguide edge coupled with LEDs to create a predominantly white light emulating sunlight derived from a blue sky. The first and second light emitting surfaces do not substantially overlap in physical alignment/ orientation so that light from the different waveguides does not color mix, as such mixing may produce an undesirable third color perception. To accomplish this, the first waveguide may comprise extraction features that are populated proximal a central portion of the waveguide, and the second waveguide may comprise extraction features that are disposed about a peripheral region of the second waveguide. When the first waveguide is illuminated with blue light the center/interior glows blue. Likewise, when the second waveguide is illuminated with white light the periphery thereof glows white. This arrangement creates the illusion of a skylight housed within a thin and flat construction. The light sources do not need to be blue and/or white, but instead may be any other color, such as a different CCT white light, to differently develop the illusion of depth. Further, the light sources may produce light of different brightness/lumen levels.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present disclosure, light is coupled into the optic, where primarily TIR is used for re-direction and collimation. This coupling allows the full range of angular emission from the source, including high-angle light, to be re-directed and collimated, resulting in higher optical efficiency in a more compact form factor.

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of mixing features, extraction features, and redirection features necessary to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a luminaire/lighting system utilizing a waveguide as described herein are not limited to any specific application and/or a specific light source.

All references, including publications, patent applications, and patents, cited herein are hereby incorporated by reference to the same extent as if each reference were individually and specifically indicated to be incorporated by reference and were set forth in its entirety herein.

The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The use of the terms "a" and "an" and "the" and similar references in the context of the present disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A luminaire comprising:
    a plurality of waveguides;
    a light source arranged to direct light into the plurality of waveguides; and
    a plurality of extraction feature patterns;
        wherein the plurality of waveguides are aligned;
        wherein a first extraction feature pattern extracts light out of a first waveguide of the plurality of waveguides and is disposed proximate to an interior portion of a first waveguide, and a second extraction feature pattern extracts light out of a second waveguide of the plurality of waveguides and is disposed proximate to a periphery of the second waveguide;
        wherein the light extracted out of the first waveguide is directed through the second waveguide to develop an appearance of depth; and
        wherein the luminaire is configured to be mounted within or against a ceiling surface, and is configured to produce emissions providing an appearance of a skylight without transmission of exterior light through any portion of the luminaire.

2. The luminaire of claim 1 wherein:
    the second waveguide comprises at least one edge surface;
    the light source comprises a plurality of light emitting diodes; and
    some light emitting diodes of the plurality of light emitting diodes direct light into the at least one edge surface of the second waveguide.

3. The luminaire of claim 2 wherein the plurality of light emitting diodes comprises a first plurality of light emitting diodes configured to generate light emissions of a first color and a second plurality of light emitting diodes configured to generate emissions of a second color.

4. The luminaire of claim 3 wherein the first color is blue and the second color is yellow.

5. The luminaire of claim 4 wherein the first waveguide is disposed behind the second waveguide.

6. The luminaire of claim 1 further comprising a housing for mounting the luminaire within or along the ceiling surface.

7. The luminaire of claim 6 wherein the first waveguide is disposed behind the second waveguide within the housing, and the second waveguide faces a room to be illuminated.

8. The luminaire of claim 7 wherein the first and second extraction feature patterns mix light emissions of different color temperatures.

9. The luminaire of claim 1, wherein the light source comprises a plurality of light emitting diodes.

10. The luminaire of claim 1, wherein the first extraction feature pattern extracts light having a first color temperature out of the first waveguide, and the second extraction feature pattern extracts light having a second color temperature out of the second waveguide.

11. The luminaire of claim 1, wherein:
    the light source comprises a plurality of light emitting diodes including at least one first light emitting diode and at least one second light emitting diode;
    the first waveguide comprises an interior coupling cavity spaced apart from edges of the first waveguide; and
    the second waveguide comprises an edge coupling cavity arranged at an edge of a body of the second waveguide.

12. A luminaire comprising:
a waveguide body comprising first and second coupling portions, and first and second extraction feature patterns, wherein the waveguide body comprises a substantially planar light extraction surface; and
first and second light sources configured to direct light emissions into the waveguide body at the first and second coupling portions, respectively;
  wherein the first coupling portion comprises an interior coupling cavity spaced apart from edges of the waveguide body, and the second coupling portion comprises an edge coupling cavity arranged at an edge of the waveguide body; and
  wherein the first extraction feature pattern is disposed on a first area of the substantially planar light extraction surface, and the second extraction feature pattern is disposed on a second area of the substantially planar light extraction surface that is non-coincident with the first area.

13. The luminaire of claim 12, wherein:
the first extraction feature pattern extracts a first spectrum of light from the first coupling portion; and
the second extraction feature pattern extracts a second spectrum of light from the second coupling portion, with the second spectrum of light differing from the first spectrum of light.

14. The luminaire of claim 13 wherein the first and second extraction feature patterns extract light comprising first and second colors, respectively.

15. The luminaire of claim 12 wherein the first and second light sources are light emitting diodes.

16. A lighting system comprising:
first and second waveguides arranged parallel to a plane, disposed adjacent to one another, and defining first and second substantially planar light-emitting surfaces, respectively; and
a plurality of light emitting diodes configured for coupling light into the first and second waveguides, the plurality of light emitting diodes comprising at least one first light emitting diode and at least one second light emitting diode; and
a patterned mask arranged between the first and second waveguides;
  wherein the first and second substantially planar light emitting surfaces emit light transverse to the plane in substantially the same direction;
  wherein light emitted from the first waveguide traverses the patterned mask and the second waveguide such that the light appears to have a source depth greater than a location of the first waveguide;
  wherein the first waveguide comprises an interior coupling cavity spaced apart from edges of the first waveguide and configured to receive emissions from the at least one first light emitting diode; and
  wherein the second waveguide comprises an edge coupling cavity arranged at an edge of a body of the second waveguide and configured to receive emissions from the at least one second light emitting diode.

17. The lighting system of claim 16 wherein the first and second waveguides operate together to produce an appearance of natural light.

18. The lighting system of claim 17 wherein the first and second waveguides operate together to produce an appearance of a skylight or a window.

19. The lighting system of claim 16 wherein the first and second waveguides operate together to produce an appearance of an optical illusion.

20. The luminaire of claim 16, wherein the first waveguide comprises a first extraction feature pattern that extracts light out of the first waveguide, the second waveguide comprises a second extraction feature pattern that extracts light out of the second waveguide, and the second extraction feature pattern differs from the first extraction feature pattern.

21. The lighting system of claim 20 wherein the first and second waveguides operate together to produce an appearance of an optical illusion.

22. The lighting system of claim 20 wherein the first and second waveguides operate together to produce an appearance of natural light.

23. The lighting system of claim 22 wherein the first and second waveguides operate together to produce an appearance of a skylight or a window.

* * * * *